United States Patent
Yokoyama et al.

(10) Patent No.: US 10,466,729 B2
(45) Date of Patent: *Nov. 5, 2019

(54) POWER SUPPLY SYSTEM, POWER MANAGEMENT, APPARATUS, POWER MANAGEMENT METHOD, AND POWER MANAGEMENT PROGRAM

(71) Applicant: NEC Corporation, Tokyo (JP)

(72) Inventors: Jun Yokoyama, Tokyo (JP); Hitoshi Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/172,597

(22) Filed: Oct. 26, 2018

(65) Prior Publication Data
US 2019/0064865 A1 Feb. 28, 2019

Related U.S. Application Data

(63) Continuation of application No. 14/895,812, filed as application No. PCT/JP2014/064449 on May 30, 2014, now Pat. No. 10,146,241.

(30) Foreign Application Priority Data

Jun. 4, 2013 (JP) ................................ 2013-118361
Nov. 15, 2013 (JP) ................................ 2013-237304

(51) Int. Cl.
*G05F 1/66* (2006.01)
*G05B 15/02* (2006.01)
(Continued)

(52) U.S. Cl.
CPC ............... *G05F 1/66* (2013.01); *G05B 15/02* (2013.01); *G06F 1/263* (2013.01); *H02J 3/00* (2013.01); *H02J 3/32* (2013.01); *H02J 7/34* (2013.01)

(58) Field of Classification Search
CPC ............................... G05B 15/02; H02J 3/00
See application file for complete search history.

(56) References Cited

U.S. PATENT DOCUMENTS 6,498,460 B1   12/2002   Atkinson
10,146,241 B2 *  12/2018   Yokoyama ................ H02J 3/00
(Continued)

FOREIGN PATENT DOCUMENTS

CN        1846338 A      10/2006
JP       2006-158146      6/2006
(Continued)

OTHER PUBLICATIONS

Chinese Office Action issued by the Intellectual Property Office for the People's Republic of China for Chinese Application No. 201480032087.9 dated May 26, 2017 (9 pages).
(Continued)

*Primary Examiner* — Mark A Connolly
(74) *Attorney, Agent, or Firm* — Wilmer Cutler Pickering Hale and Dorr LLP

(57) ABSTRACT

To ensure the electricity storage amount of a power storage device in preparation for the peak period of power consumption when supplying power to a plurality of devices, a power management apparatus includes a controller that controls the plurality of devices that receive a distribution of total power supplied from the power storage device and another power supply, an acquirer that acquires the remaining electric energy of the power storage device, and a determiner that determines whether the remaining electric energy of the power storage device is not more than a first predetermined value. If the remaining electric energy of the power storage device is not more than the first predetermined value, the
(Continued)

controller controls the plurality of devices such that the power from the other power supply is distributed to the power storage device.

20 Claims, 20 Drawing Sheets

(51) Int. Cl.
*H02J 3/00* (2006.01)
*H02J 3/32* (2006.01)
*H02J 7/34* (2006.01)
*G06F 1/26* (2006.01)

(56) References Cited

U.S. PATENT DOCUMENTS

| | | |
|---|---|---|
| 2007/0029799 A1 | 2/2007 | Shimizu et al. |
| 2009/0100275 A1 | 4/2009 | Chang et al. |
| 2011/0138198 A1 | 6/2011 | Boss et al. |
| 2011/0252247 A1 | 10/2011 | Yokoyama |
| 2011/0291479 A1 | 12/2011 | Lee |
| 2011/0316954 A1 | 12/2011 | Komatsu |
| 2012/0235493 A1 | 9/2012 | Kiuchi et al. |
| 2013/0311794 A1 | 11/2013 | Stewart |
| 2013/0316954 A1 | 11/2013 | Moskal |
| 2014/0077606 A1 | 3/2014 | Ci |
| 2015/0095669 A1 | 4/2015 | Iwamoto |

FOREIGN PATENT DOCUMENTS

| | | |
|---|---|---|
| JP | 2008-067439 | 3/2008 |
| JP | 2008-306832 A | 12/2008 |
| JP | 2009-124792 A | 6/2009 |
| JP | 2011-019363 A | 1/2011 |
| JP | 2011-223786 | 11/2011 |
| JP | 2012-010458 A | 1/2012 |
| JP | 2012-120295 A | 6/2012 |
| JP | 5-159885 A | 3/2013 |
| JP | 2013-106483 A | 5/2013 |
| WO | WO-2011/016273 A1 | 2/2011 |
| WO | WO-2011/065496 A1 | 6/2011 |

OTHER PUBLICATIONS

International Search Report corresponding to PCT/JP2014/064449, 4 pages, dated Jul. 15, 2014.

Japanese Office Action issued by the Japan Patent Office for Application No. 2013-237304 dated Oct. 6, 2015 (3 pages).

Japanese Office Action issued by the Japan Patent Office for Application No. 2015-012826 dated May 27, 2016 (2 pages).

Japanese Office Action issued by the Japan Patent Office for Japanese Application No. 2015-012826 dated Oct. 27, 2015 (12 pages).

* cited by examiner

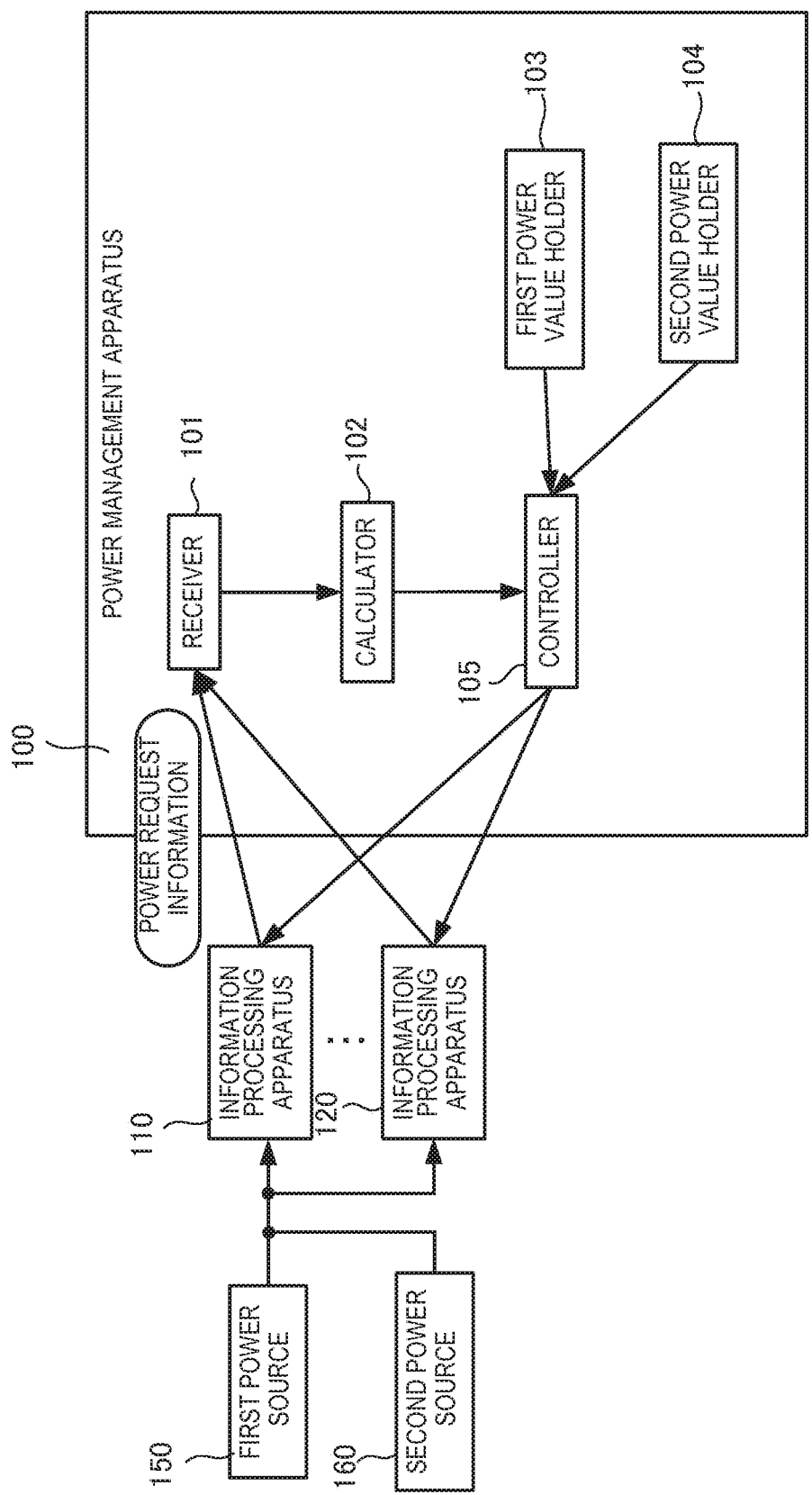
F I G. 1

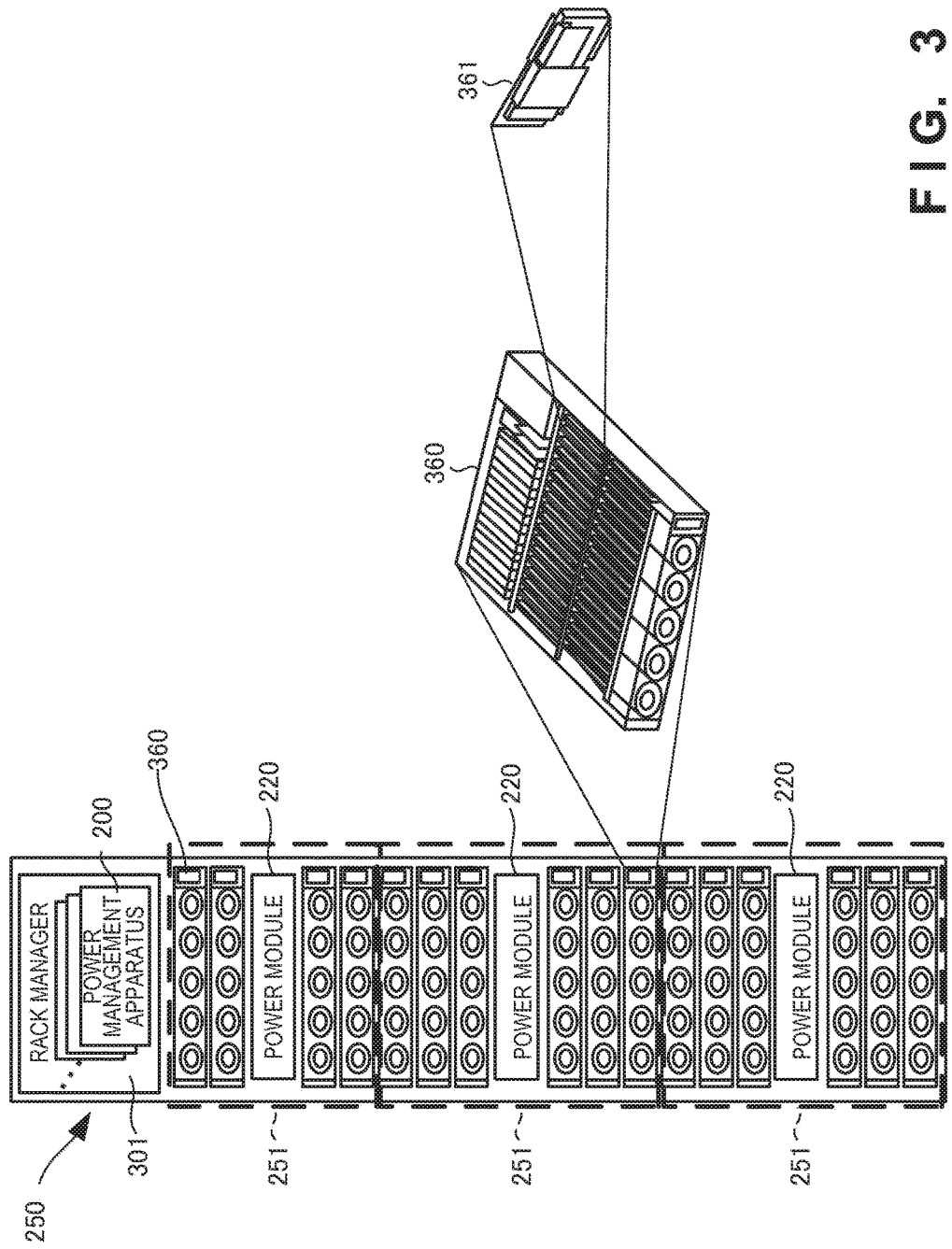

| | MAXIMUM USED ELECTRIC ENERGY (W) | MINIMUM USED ELECTRIC ENERGY (W) | REQUESTED ELECTRIC ENERGY (W) | PRIORITY OF APPLICATION IN PROGRESS | SERVER PRIORITY |
|---|---|---|---|---|---|
| SERVER A | 100 | 50 | 80 | 1 | 1 |
| SERVER B | 130 | 70 | 110 | 2 | 2 |
| SERVER C | 170 | 20 | 100 | 3 | 3 |
| SERVER D | 50 | 40 | 50 | 4 | 5 |
| ... | ... | ... | ... | ... | ... |

FIG. 7

POWER SUPPLY SYSTEM, POWER MANAGEMENT, APPARATUS, POWER MANAGEMENT METHOD, AND POWER MANAGEMENT PROGRAM

CROSS-REFERENCE TO RELATED APPLICATIONS

This application is a continuation of, and claims the benefit of priority of, U.S. patent application Ser. No. 14/895,812, filed Dec. 3, 2015, a national stage application of International Application No. PCT/JP2014/064449 entitled "POWER SUPPLY SYSTEM, POWER MANAGEMENT APPARATUS, POWER MANAGEMENT METHOD, AND POWER MANAGEMENT PROGRAM," filed on May 30, 2014, which claims the benefit of the priority of Japanese Patent Application No. 2013-118361, filed on Jun. 4, 2013, and Japanese Patent Application No. 2013-237304, filed on Nov. 15, 2013, the disclosures of each of which are hereby incorporated by reference in their entirety.

TECHNICAL FIELD

The present invention relates to a power supply system, a power management apparatus, a power management method, and a power management program.

BACKGROUND ART

In the above technical field, patent literature 1 discloses a technique of supplying power supplied from a power supply unit and a secondary battery to a device main body. Patent literature 2 discloses a technique of performing power supply switching control for a plurality of targets in accordance with a demand.

CITATION LIST

Patent Literature

Patent literature 1: Japanese Patent Laid-Open No. 2011-223786
Patent literature 2: Japanese Patent Laid-Open No. 2006-158146

SUMMARY OF THE INVENTION

Technical Problem

In the techniques described in the above literatures, however, when supplying power to a plurality of devices, it is impossible to ensure the electricity storage amount of a power storage device in preparation for the peak period of power consumption.

The present invention enables to provide a technique of solving the above-described problem.

Solution to Problem

One aspect of the present invention provides a power management apparatus comprising:
a controller that controls a plurality of devices that receive a distribution of total power supplied from a power storage device and another power supply;
an acquirer that acquires a remaining electric energy of the power storage device; and
a determiner that determines whether the remaining electric energy of the power storage device is not more than a first predetermined value,
wherein if the remaining electric energy of the power storage device is not more than the first predetermined value, the controller controls the plurality of devices such that the power from the other power supply is distributed to the power storage device.

Another aspect of the present invention provides a power management method of a system including a plurality of devices, a power storage device, and another power supply, comprising:
acquiring a remaining electric energy of the power storage device;
determining whether the remaining electric energy of the power storage device is not more than a first predetermined value; and
controlling the plurality of devices such that the power from the other power supply is distributed to the power storage device if the remaining electric energy of the power storage device is not more than the first predetermined value.

Still other aspect of the present invention provides a power management program for causing a computer to execute a method of managing power of a system including a plurality of devices, a power storage device, and another power supply, the method comprising:
acquiring a remaining electric energy of the power storage device;
determining whether the remaining electric energy of the power storage device is not more than a first predetermined value; and
controlling the plurality of devices such that the power from the other power supply is distributed to the power storage device if the remaining electric energy of the power storage device is not more than the first predetermined value.

Still other aspect of the present invention provides a system including a power storage device and another power supply, which supply power to a plurality of devices, comprising:
an acquirer that acquires a remaining electric energy of the power storage device;
a determiner that determines whether the remaining electric energy of the power storage device is not more than a first predetermined value; and
a controller that controls the plurality of devices such that the power from the other power supply is distributed to the power storage device if the remaining electric energy of the power storage device is not more than the first predetermined value.

Advantageous Effects of Invention

According to the present invention, when supplying power to a plurality of devices, it is possible to ensure the electricity storage amount of a power storage device in preparation for the peak period of power consumption of the plurality of devices.

BRIEF DESCRIPTION OF THE DRAWINGS

FIG. 1 is a block diagram showing the arrangement of a power management apparatus according to the third embodiment of the present invention.

FIG. 3 is a block diagram showing the hardware arrangement of the server system according to the fourth embodiment of the present invention:

FIG. 7 is a table for explaining the function of the power management apparatus according to the fourth embodiment of the present invention:

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 16:
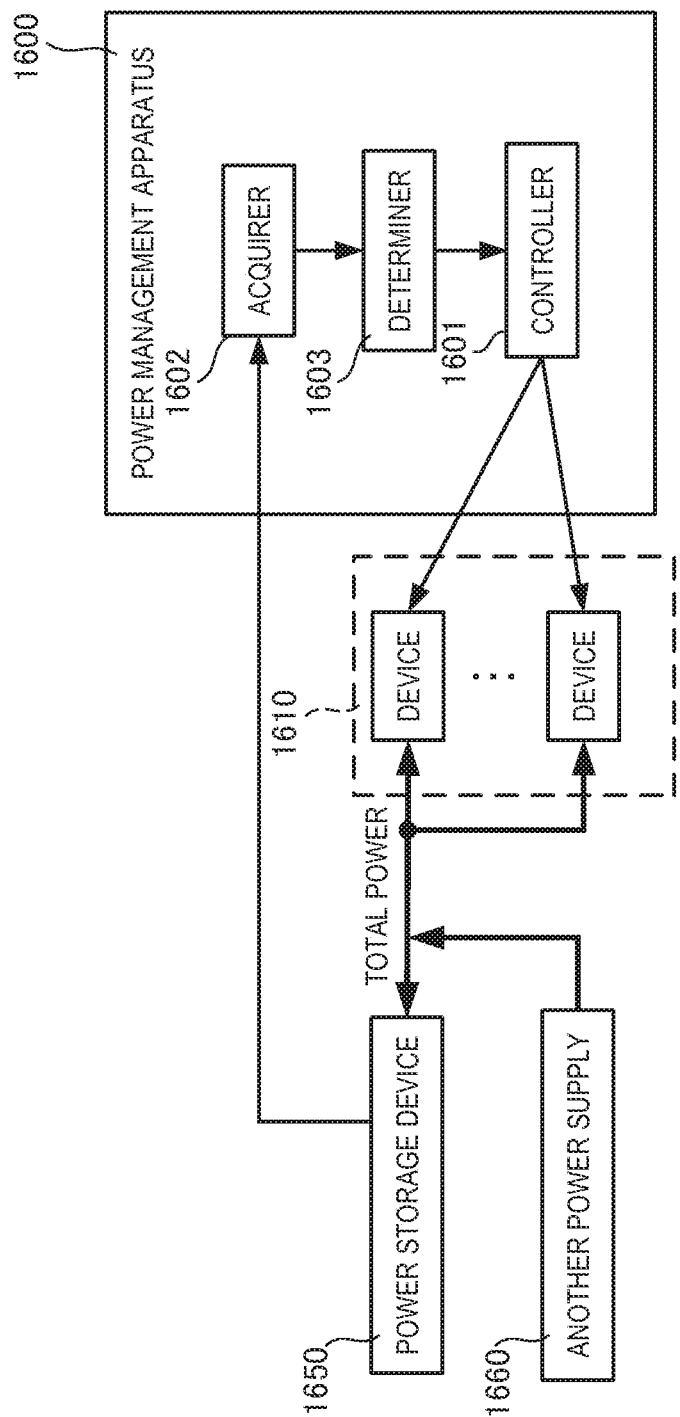
FIG. 16 is a block diagram showing the arrangement of a power management apparatus according to the first embodiment of the present invention.

A power management apparatus 1600 according to the first embodiment of the present invention will be described with reference to FIG. 16. The power management apparatus 1600 includes a controller 1601, an acquirer 1602, and a determiner 1603.

The controller 1601 controls a plurality of devices 1610 that receive the distribution of total power supplied from a power storage device 1650 and another power supply 1660. The acquirer 1602 acquires the remaining electric energy of the power storage device 1650. The determiner 1603 determines whether the remaining electric energy of the power storage device 1650 is equal to or less than a first predetermined value. If the remaining electric energy of the power storage device 1650 is equal to or less than the first predetermined value, the controller 1601 controls the plurality of devices 1610 such that the power from the power supply 1660 is distributed to the power storage device 1650.

With the above arrangement, according to this embodiment, charging/discharging is switched in accordance with the remaining electric energy of the power storage device. Hence, when supplying power to the plurality of devices, it is possible to ensure the electricity storage amount of the power storage device in preparation for the peak period of power consumption of the plurality of devices.

Second Embodiment

Figure 17:
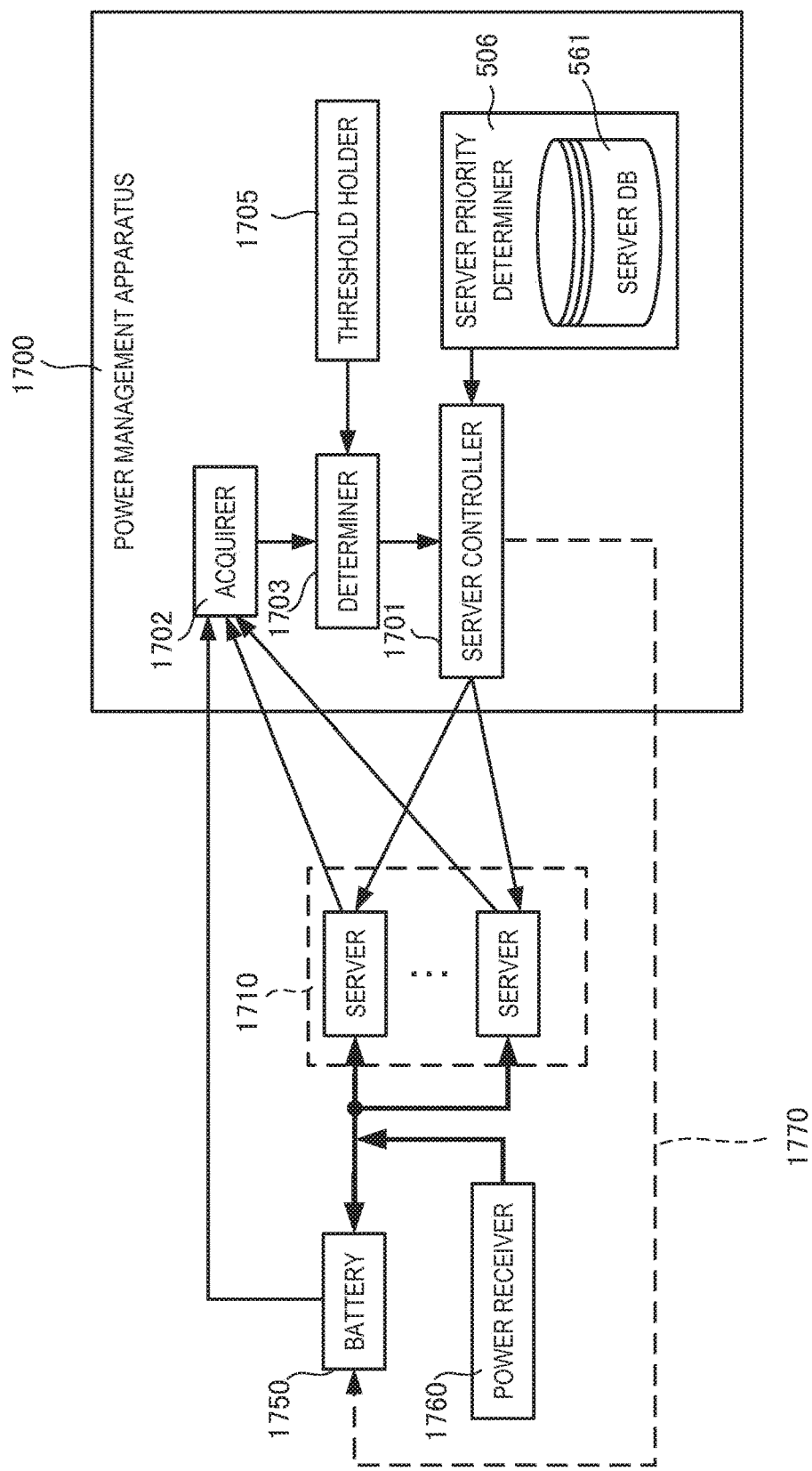
FIG. 17 is a block diagram showing the arrangement of a power management apparatus according to the second embodiment of the present invention.

A power management apparatus 1700 according to the second embodiment of the present invention will be described with reference to FIG. 17. The power management apparatus 1700 includes a server controller 1701, an acquirer 1702, a determiner 1703, a threshold holder 1705, and a server priority determiner 506. The server controller 1701 controls a plurality of servers 1710 that receive the distribution of total power supplied from a battery 1750 and a power receiver 1760. The acquirer 1702 acquires the remaining electric energy of the battery 1750. The acquirer 1702 also acquires information of an application and the like executed in each server 1710 serving as an information processing apparatus.

The determiner 1703 refers to the threshold holder 1705, and determines whether the remaining electric energy of the battery 1750 serving as a power storage device is equal to or less than a first predetermined value.

If the remaining electric energy of the battery 1750 is equal to or less than the first predetermined value, the server controller 1701 starts controlling the plurality of servers 1710 such that the power from the power receiver 1760 is distributed to the battery 1750 with priority over the plurality of servers 1710. More specifically, to set the battery 1750 to a charging mode, the server controller 1701 changes the servers 1710 to a low power mode with a little power consumption. If the power of the battery 1750 is not necessary (if surplus power exists), the battery 1750 automatically starts charging. The server controller 1701 may control the battery 1750 and switch on/off of the power supply from the power receiver 1760 (dotted arrow 1770 in FIG. 17)

The determiner 1703 refers to the threshold holder 1705, and determines whether the remaining electric energy of the battery 1750 has exceeded a second predetermined value larger than the first predetermined value.

The server controller 1701 controls the plurality of servers 1710 such that the power from the power receiver 1760 is distributed to the battery 1750 with priority over the plurality of servers 1710 until the remaining electric energy of the battery 1750 exceeds the second predetermined value larger than the first predetermined value. That is, if the remaining electric energy of the battery 1750 exceeds the second predetermined value, the server controller 1701 controls the plurality of servers 1710 such that the power from the power receiver 1760 is distributed to the second power value holder servers 1710 with priority over the battery 1750. The control states of the plurality of servers 1710 can be confirmed on the console screen of a display provided on the server controller 1701. Using the console screen, the user may turn on/off the battery charging priority function, display a server state, select a server, or confirm an alarm in case of battery level lowering or power oversupply.

The server controller 1701 dynamically changes the second predetermined value in accordance with the states of the plurality of servers 1710. In particular, the server controller 1701 counts the number of servers 1710 that are operating, and determines the second predetermined value based on the number. That is, when the number increases, the server controller 1701 increases the second predetermined value. Alternatively, the server controller 1701 may increase the second predetermined value when the calculation amount or the number of virtual machines of the plurality of servers 1710 increases.

In addition, the server controller 1701 may control the plurality of servers 1710 such that charging of the battery 1750 to a predetermined electric energy is completed within a predetermined time by distributing power from the power receiver 1760 to the battery 1750 with priority over the servers 1710.

To enable power distribution to the battery 1750, the server controller 1701 reduces the power consumption of a predetermined server included in the plurality of servers 1710. Especially, each server 1710 can be driven in at least two driving modes including a high power mode (H mode) in which the power consumption is high and a low power mode (L mode) in which the power consumption is low. The server controller 1701 determines the driving mode (H/L) of each of the plurality of servers 1710. If it is necessary to reduce the power consumption of a server, the server 1710 is selectively driven in the L mode. Alternatively, the power consumption of the server may be reduced by changing the response from that for a physical server to that for a virtual server.

The server controller 1701 selects the server 1710 based on priority and reduces the power consumption. To enable power distribution to the battery 1750, the server controller 1701 selects the server 1710 in ascending order of priority and reduces the power consumption. The server priority is determined by the server priority determiner 506 with reference to a server database 561.

FIG. 7 is a table for explaining the contents of the server database 561 of the power management apparatus 1700 according to this embodiment. The server database 561 stores a maximum used electric energy, a minimum used electric energy, a requested electric energy, priority of an application in progress, and the like which are acquired from each server 1710. The server priority determiner 506 determines server priority in accordance with the electric energies, application, and the like, and sets it in the server database 561. Various priority determining methods are considerable. For example, an ID is physically added to the hardware of each server 1710 itself, and the servers may be divided into server groups No. 1, No. 2, and No. 3. Priority may be determined in accordance with a fee (SLA: Service-Level Agreement) paid by the user of each server 1710. Priority may logically be determined based on the type of an OS (Operating System) or the type of an executable application. Priority may be determined based on "self-assessment" from each server 1710. Server priority may be determined based on whether the load on an I/O is large. Many servers are not CPU- but I/O-bound. In a case in which the load on the I/O is larger than a predetermined value, the output of the server itself changes little even if the driving mode of the CPU itself is changed to L. Hence, a method is also usable in which the loads on I/Os are compared between the servers, and a server with a large load on the I/O is given lower priority so that the server is easily set in the L mode.

According to the above-described server database 561, for example, the server controller 1701 selects the server 1710 based on the priority of an application executed in each server 1710.

In addition, for example, the acquirer 1702 may acquire the actual power consumption of each server 1710. In this case, the server controller 1701 may control to selectively reduce the power consumption for a server with a high power consumption out of the plurality of servers 1710.

If the remaining electric energy of the battery 1750 is equal to or less than a third predetermined value, and the power consumption of the plurality of servers 1710 is equal to or more than the suppliable electric energy of the power receiver 1760, the server controller 1701 may output an alarm or stop the operations of the plurality of servers 1710.

The determiner 1703 may also determine whether the remaining electric energy of the battery 1750 is equal to or more than a fifth predetermined value larger than the first predetermined value. If the remaining electric energy of the battery 1750 is equal to or more than the fifth predetermined value larger than the predetermined value, the server controller 1701 may distribute total power supplied from the battery 1750 and the power receiver 1760 to the plurality of servers 1710.

If the remaining electric energy of the battery 1750 is equal to or more than the fifth predetermined value larger than the predetermined value, the server controller 1701 may distribute the power supplied from the power receiver 1760 to the plurality of servers 1710 without discharging or charging the battery 1750.

As described above, upon determining that the remaining electric energy of the battery 1750 is equal to or more than the fifth predetermined value, the server controller 1701 may select a server with high priority from the plurality of servers 1710 and increase its power consumption.

Upon determining that the remaining electric energy of the battery 1750 is equal to or more than the fifth predetermined value, the server controller 1701 may select the server 1710 shifted to a mode with a low power consumption out of the plurality of servers 1710 and increase its power consumption.

As described above, according to this embodiment, charging/discharging is switched in accordance with the remaining electric energy of the battery. Hence, when supplying power to the plurality of devices, it is possible to ensure the electricity storage amount of the power storage device in preparation for the peak period of power consumption of the plurality of devices.

Third Embodiment

A power management apparatus 100 according to the third embodiment of the present invention will be described with reference to FIG. 1. The power management apparatus 100 includes a receiver 101, a calculator 102, a first power value holder 103, a second power value holder 104, and a controller 105.

The receiver 101 receives power request information about a requested electric energy from each of a plurality of information processing apparatuses 110 and 120. The calculator 102 calculates a total requested electric energy requested by the plurality of information processing apparatuses 110 and 120 based on the power request information. The first power value holder 103 holds a first suppliable power value from a first power source 150 capable of supplying power to the plurality of information processing apparatuses 110 and 120. The second power value holder 104 holds a second suppliable power value from a second power source 160 capable of supplying power to the plurality of information processing apparatuses 110 and 120. The controller 105 controls the plurality of information processing apparatuses 110 and 120 based on the total requested electric energy, the first suppliable power value, and the second suppliable power value.

According to the above-described arrangement, the information processing apparatuses are controlled in consideration of suppliable power and the request of each information processing apparatus. It is therefore possible to supply power to the plurality of information processing apparatuses 110 while considering balance.

Fourth Embodiment

Figure 2:
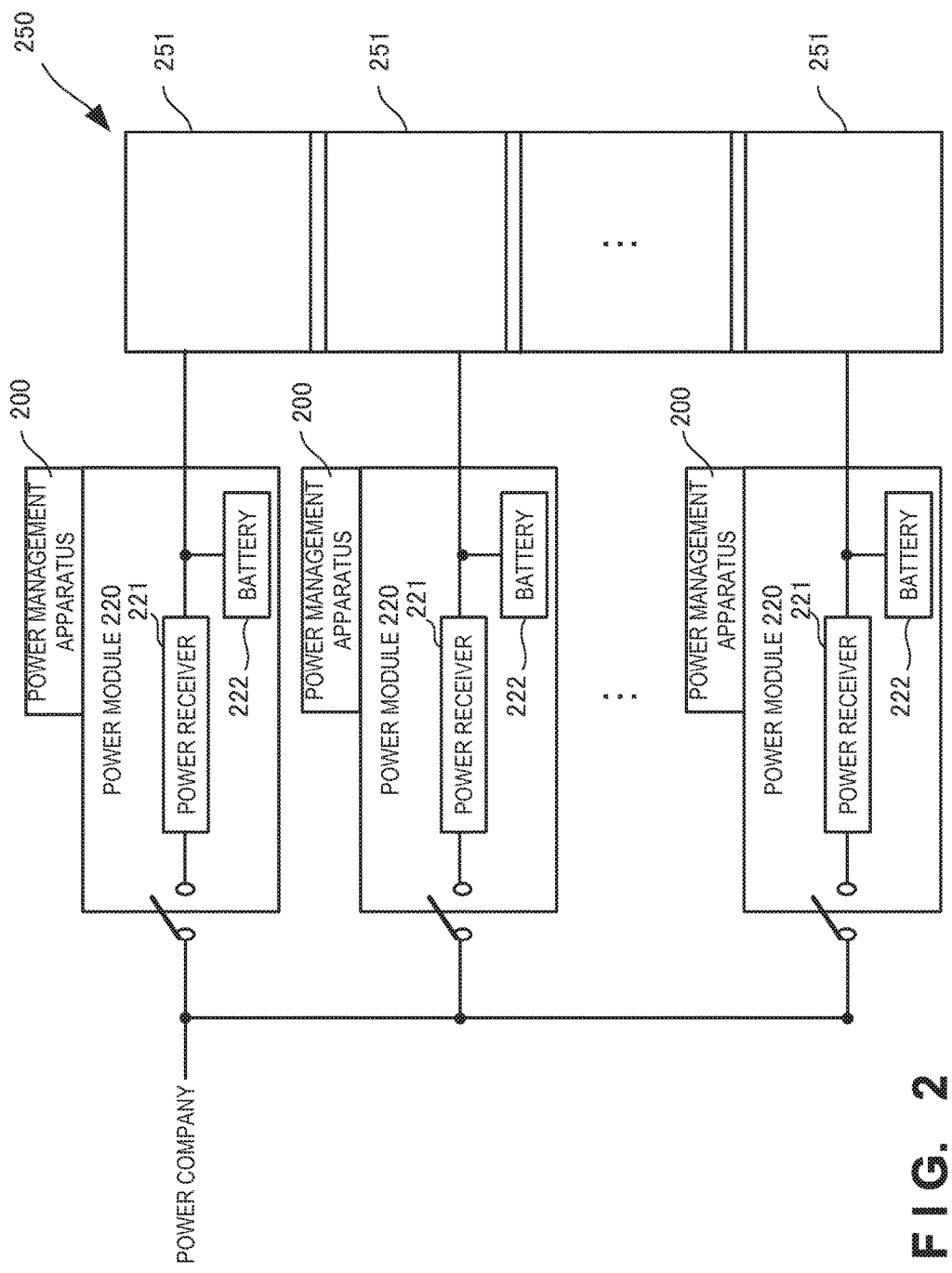
FIG. 2 is a block diagram showing the power-related arrangement of a server system according to the fourth embodiment of the present invention.

A power management apparatus according to the fourth embodiment of the present invention will be described next with reference to FIGS. 2 to 10. FIG. 2 is a block diagram showing the power-related arrangement of a server system as an example of an information processing system including the power management apparatus.

Referring to FIG. 2, in a rack 250 that stores a plurality of servers, a power module 220 and a power management apparatus 200 are prepared for each region 251 that is a predetermined physical region. The power module 220 includes a power receiver 221 that receives system power from a power company and supplies the power to servers in the rack 250, and a battery 222 that stores power supplied from the power receiver 221. The battery 222 has performance that changes between the regions 251, and a maximum electricity storage amount according to power requested in the corresponding region 251. If a surplus exists in the power supplied from the power receiver 221 to the region 251, the surplus power can be used to store electricity in the battery 222.

The power management apparatus 200 monitors the power receiver 221 and the battery 222 in the corresponding power module 220, and controls each server in accordance with their suppliable power values. FIG. 2 illustrates the power management apparatuses 200 as a plurality of separate components added to the power modules 220. However, the present invention is not limited to this.

FIG. 3 is a block diagram showing the hardware arrangement of the server system according to this embodiment. The server system rack 250 includes a rack manager 301, a plurality of chassis 360, and the plurality of power modules 220. The rack manager 301 includes the power management apparatuses 200 as many as the regions 251, and manages the power in the rack as a whole. The power module 220 is prepared for each region 251, and supplies power to the plurality of chassis 360 included in the region 251. The chassis 360 incorporates a plurality of servers 361.

Figure 4A:
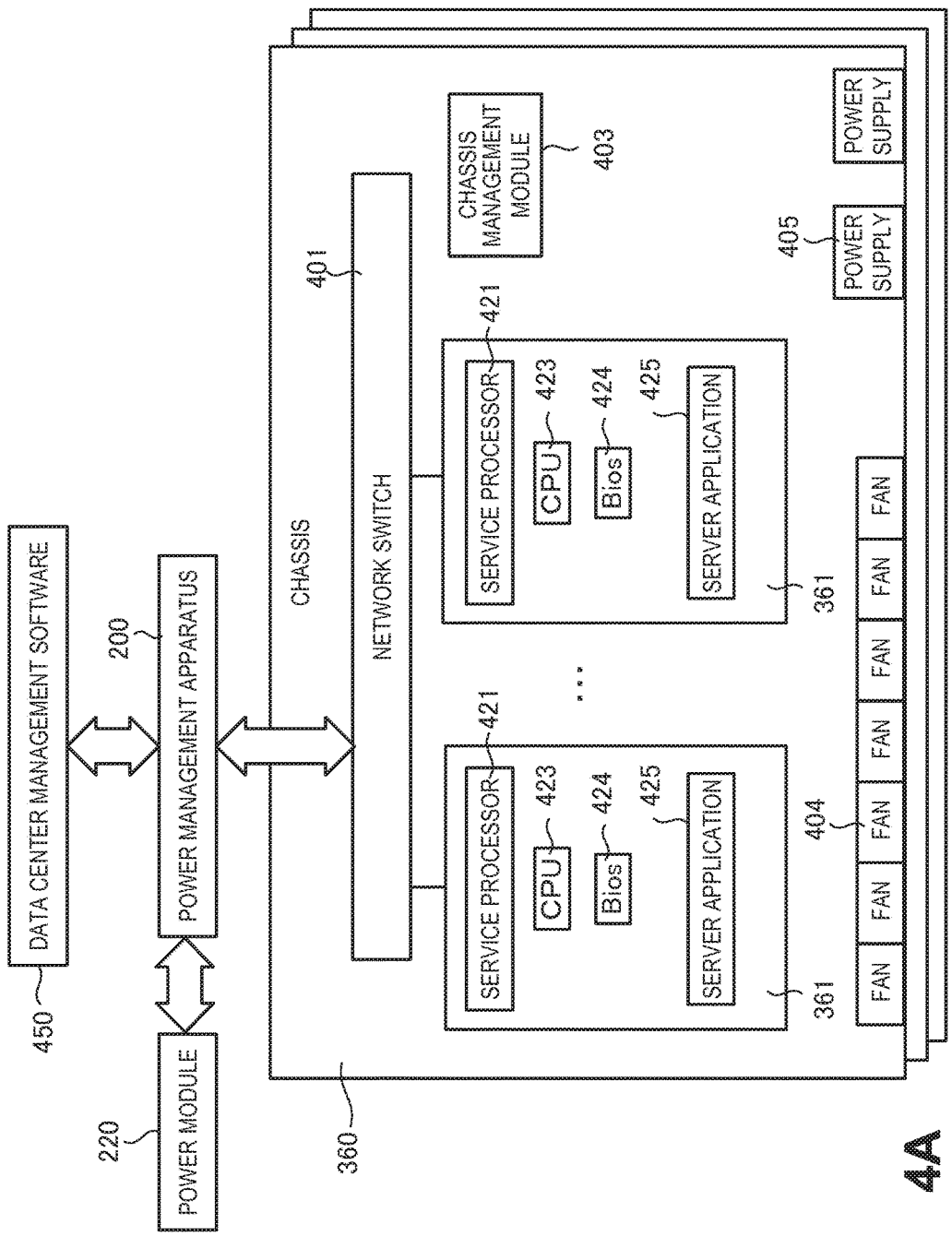
FIG. 4A is a block diagram showing the hardware arrangement and software configuration in a chassis according to the fourth embodiment of the present invention.

FIG. 4A is a block diagram showing the hardware arrangement and software configuration in the chassis according to this embodiment. The power management apparatus 200 is controlled by data center management software 450. The chassis 360 includes a network switch 401, the plurality of servers 361, a chassis management module 403, fans 404, and power supplies 405. Each server 361 includes a service processor 421 called a BMC (Base board Management Controller), and a CPU 423 called an SoC (System on Chip). The CPU 423 is a CPU LSI, and has, in a single chip, not only a CPU core but also functions such as SATA (Serial Advanced Technology Attachment)/SAS (Serial Attached Small Computer System Interface), PCIexpress (Peripheral Component Interconnect Express), and Ethernet®, which are conventionally separate LSIs.

Figure 4B:
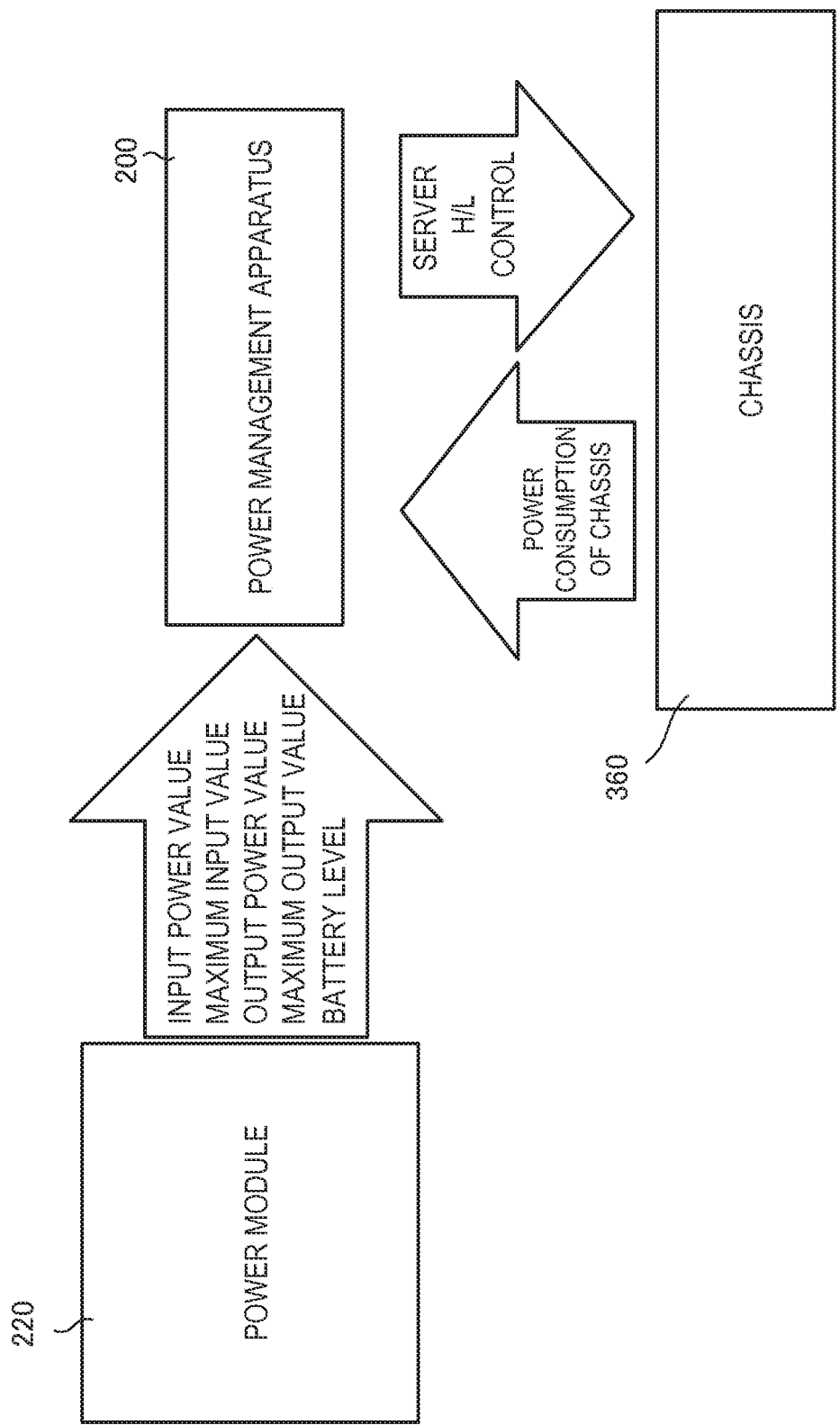
FIG. 4B is a view showing exchange of power supply-related information according to the fourth embodiment of the present invention.

FIG. 4B is a view showing exchange of power supply-related information according to this embodiment. The power management apparatus 200 receives an input power value (the value of external power used by the power module 220), a maximum input power value (the maximum value of external power that can be provided to the region), an output power value (a power value provided to the region by the power module), a maximum output power value (the sum of external power and battery supply power), and a battery level value (remaining electric energy), which are provided by the power module 220. On the other hand, the power management apparatus 200 receives, from the chassis 360, power consumption in the chassis 360 or power consumption of each server. The power management apparatus 200 then sends an H/L control instruction to each server in the chassis 360.

Figure 5:
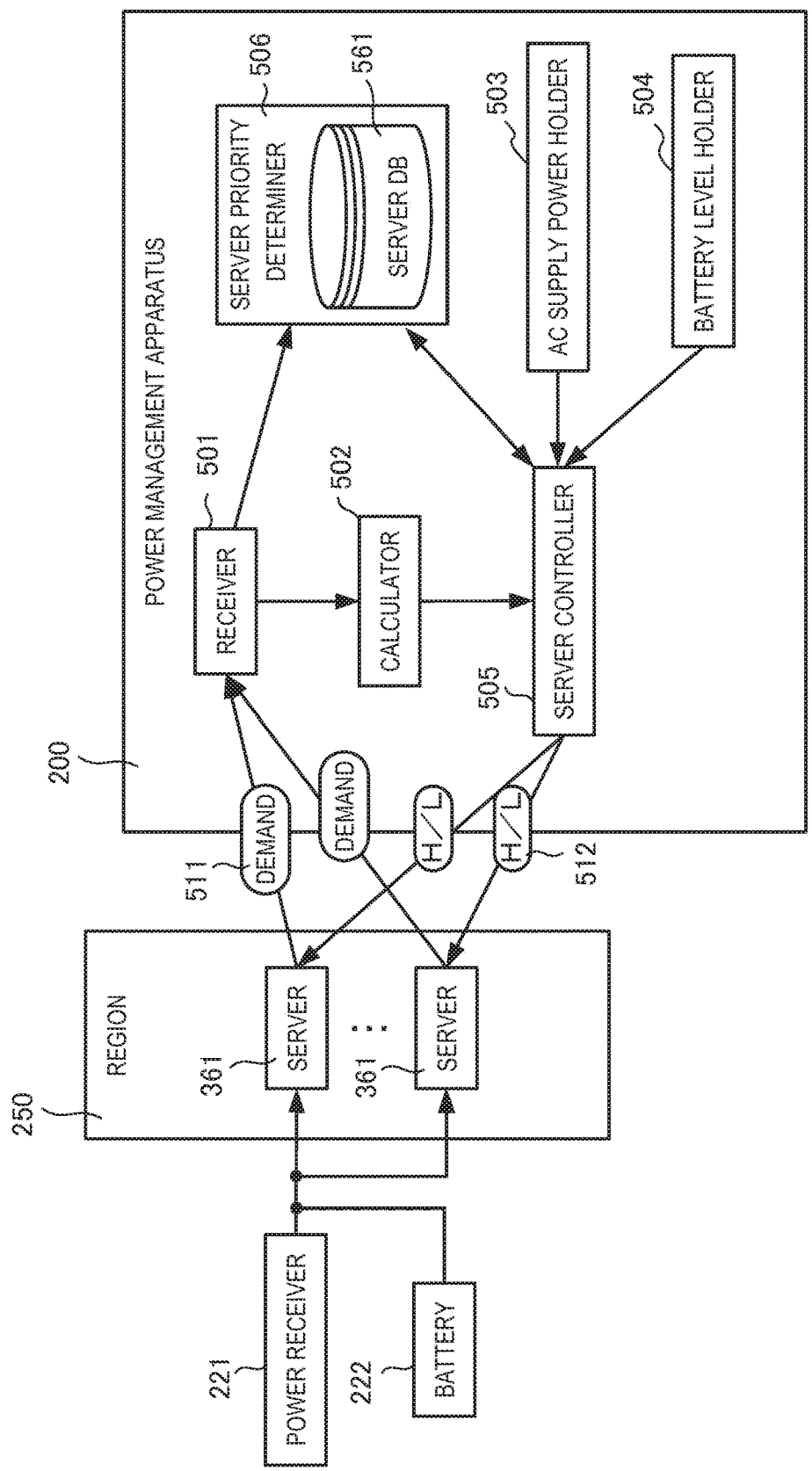
FIG. 5 is a block diagram showing the functional arrangement of a power management apparatus according to the fourth embodiment of the present invention.

FIG. 5 is a block diagram showing the functional arrangement of the power management apparatus according to this embodiment.

A receiver 501 receives, from each of the plurality of servers 361, a demand 511 concerning an electric energy requested by each of the plurality of servers 361.

A calculator 502 calculates a total requested electric energy requested by the plurality of servers 361 based on the demands 511. An AC supply power holder 503 holds an AC power value supplied from the power receiver 221 capable of supplying power to a plurality of servers. A battery level holder 504 holds the battery level value of the battery 222 capable of supplying power to the plurality of server 361.

A server controller 505 controls the plurality of servers 361 based on the demands 511, the AC power value, and the battery level value. Especially, each server 361 can be driven in at least two driving modes including a high power mode (H mode) in which the power consumption is high and a low power mode (L mode) in which the power consumption is low. The server controller 505 determines a driving mode (H/L) 512 of each of the plurality of servers.

The power management apparatus 200 includes a server priority determiner 506 that determines the priority of each of the plurality of servers 361. The server priority determiner 506 includes a server database 561 in which the attribute of each server 361 and priority derived from it are set. If the demand 511 is smaller than the total power value of the AC power value and the battery level value, the server controller 505 determines whether to use the battery 222. Upon determining to use the battery 222, the server controller 505 drives the plurality of servers 361 using both power from the power receiver 221 and power from the battery 222. Upon determining not to use the battery 222, the server controller 505 controls the driving mode (H/L) 512 of each of the plurality of servers in accordance with priority such that that the plurality of servers 361 can be driven only by power from the power receiver 221.

Upon determining not to use the battery 222, the server controller 505 controls to drive a server with low priority in a mode with a lower power consumption as compared to a server with high priority such that that the plurality of servers 361 can be driven only by power from the power receiver 221. That is, the server with high priority is driven in the H mode, and the server with low priority is driven in the L mode. For example, if the battery level of the battery 222 is equal to or less than a predetermined value, the server controller 505 controls to drive a server with low priority in a mode with a lower power consumption as compared to a server with high priority such that that the plurality of servers 361 can be driven only by power from the power receiver 221.

Figure 6:
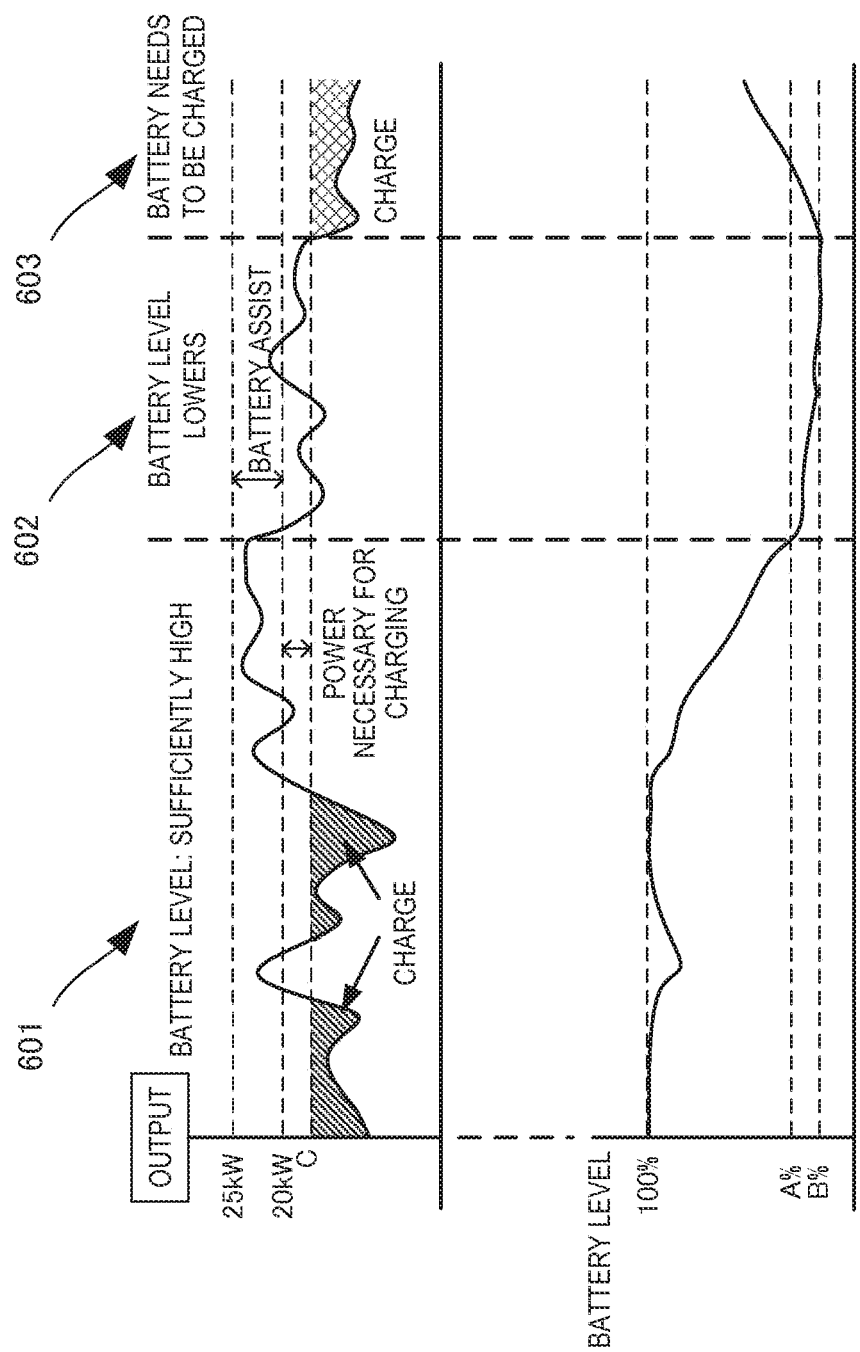
FIG. 6 is a graph for explaining the function of the power management apparatus according to the fourth embodiment of the present invention.

FIG. 6 is a graph for explaining the function of the power management apparatus according to this embodiment. For example, assume that the maximum output power is 25 kw, and the input power is 20 kw. During a period in which the battery level is sufficient, when the output power lowers to C kw or less, charging is performed. If the output power exceeds 20 kw, the mode transits to a battery assist mode (a mode to use the battery 222). On the other hand, if the battery level lowers (for example, lowers to A % or less) due to use of the battery 222, servers other than those with high priority cannot transit to the battery assist mode. The driving modes of some servers are changed to a power saving mode as needed. If the battery level of the battery 222 further lowers (for example, lowers to B % or less), the battery assist mode is not permitted. The servers 361 are actively set in the power saving mode, and the battery 222 is charged. The thresholds A, B, and C can be set by the system operator.

FIG. 7 is a table for explaining the contents of the server database 561 of the power management apparatus according to this embodiment. The server database 561 stores a maximum used electric energy, a minimum used electric energy, a requested electric energy, priority of an application in progress, and the like which are received from each server 361 as the demand 511. The server priority determiner 506 determines server priority in accordance with the electric energies, application, and the like, and sets it in the server database 561. Various priority determining methods are considerable. For example, an ID is physically added to the hardware of each server 361 itself, and the servers may be divided into server groups No. 1, No. 2, and No. 3 in descending order of priority. Priority may be determined in accordance with a fee (SLA: Service-Level Agreement) paid by the user of each server 361. Priority may logically be determined based on the type of an OS (Operation System) or the type of an executable application. Priority may be determined based on "self-assessment" from each server 361.

Figure 8:
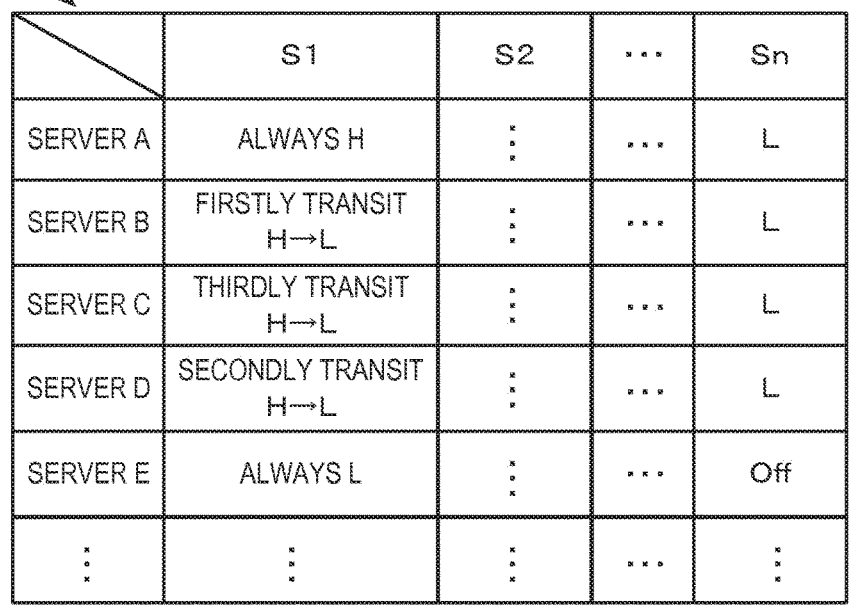
FIG. 8 is a table for explaining the function of the power management apparatus according to the fourth embodiment of the present invention.

FIG. 8 is a table for explaining the detailed contents of priority determined by the power management apparatus according to this embodiment. In a table 801, how to drive each server 361 is determined in accordance with situations (S1 to Sn) such as a time zone. For example, in the situation S1, a server A is always driven in the H mode, and a server E is always driven in the L mode. Servers B to D transit from the H mode to the L mode in the order of server B, server D, and server C in accordance with the supply power value. For example, in the situation Sn (for example, in a case of power failure), the servers A to D are driven in the L mode, and the server E is turned off (sleep).

Figure 9:
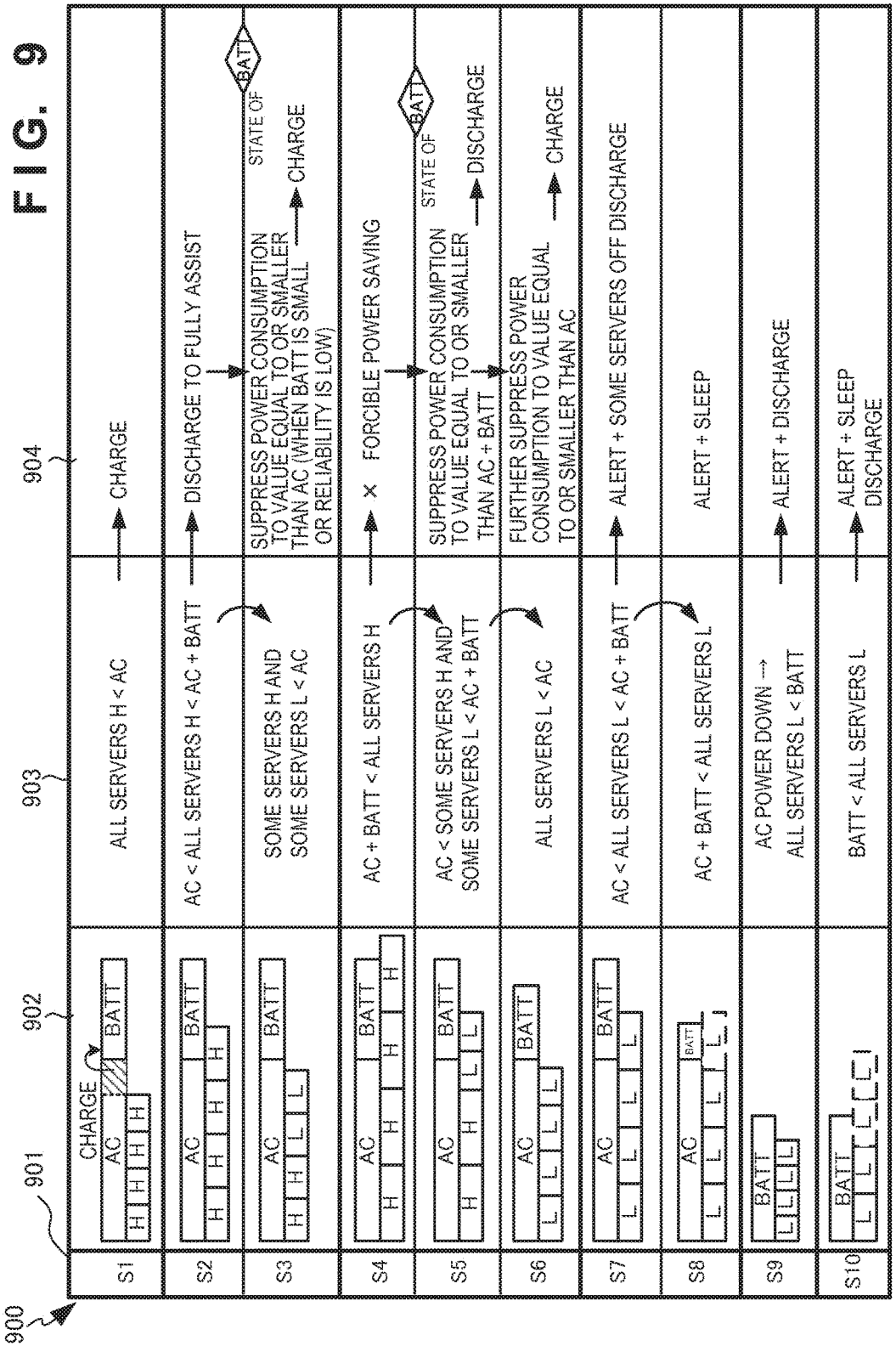
FIG. 9 is a view for explaining the function of the power management apparatus according to the fourth embodiment of the present invention.

FIG. 9 is a view for explaining the function of the power management apparatus according to this embodiment. FIG. 9 illustrates a table 900 that shows examples of server driving control in the respective situations. The table 900 shows a server control method in each of, for example, 10 situations S1 to S10. A column 901 shows situation numbers. A column 902 schematically shows suppliable power (upper bar) and the driving modes of the servers (lower bar) in each situation. An upper bar in the column 902 represents the magnitudes of system power (AC) and battery power (BATT), which can be output to the region 251 in each situation. On the other hand, an lower bar in the column 902 represents the magnitudes of power consumptions of the servers 361 (here, only four servers). The characters in the bar indicate the driving modes of the servers 361.

A column 903 shows each situation as an expression. A column 904 shows the states of the battery and the like.

The situation S1 indicates a situation in which the total power consumption (necessary power) when all servers are driven in the H mode does not exceed the supply power value (AC) of the system power. In this case, the battery 222 need not be used. Conversely, the server controller 505 uses the surplus component of the system power to charge the battery 222.

The situation S2 indicates a situation in which the total power consumption when all servers are driven in the H mode exceeds the supply power value (AC) of the system power but not the maximum suppliable power value (AC+BATT) that is the sum of the supply power value (AC) and the power of the battery 222. In this case, all servers may be driven in the H mode by discharging the battery 222 to attain full assist. If the remaining power value of the battery 222 falls below a predetermined value, or the reliability of the battery 222 lowers in this situation, the situation may transit to the situation S3.

The situation S3 indicates a situation in which the battery 222 cannot be used or is not used. In this situation, the servers are sequentially changed to the L mode in ascending order of priority until the power consumption of all servers becomes equal to or less than the supply power value (AC) of the system power (suppressed to AC). If there is a surplus of system power, the battery 222 is charged.

The situation S4 indicates a situation in which the total power consumption when all servers are driven in the H mode exceeds the maximum suppliable power value (AC+BATT) that is the sum of the supply power value (AC) of the system power and the power of the battery 222. In this case, all servers cannot be driven in the H mode even by discharging the battery 222 to attain full assist.

In this case, first, as indicated by the situation S5, the servers are sequentially changed to the L mode in ascending order of priority until the power consumption of all servers becomes equal to or less than the maximum suppliable power value (AC+BATT) (suppressed to AC+BATT). If the remaining power value of the battery 222 falls below a predetermined value, or the reliability of the battery 222 lowers in the situation S5, the situation transits to the situation S6.

The situation S6 indicates a situation in which the battery 222 cannot be used or is not used. In this situation, the servers are sequentially changed to the L mode in ascending order of priority until the power consumption of all servers becomes equal to or less than the supply power value (AC) of the system power (suppressed to AC). If there is a surplus of system power, the battery 222 is charged.

The situation S7 indicates a situation in which the total power consumption when all servers are driven in the L mode exceeds the supply power value (AC) of the system power but not the maximum suppliable power value (AC+BATT) that is the sum of the supply power value (AC) and the power of the battery 222. In this case, all servers may be driven in the L mode by discharging the battery 222 to attain full assist. If the remaining power value of the battery 222 falls below a predetermined value, or the reliability of the battery 222 lowers in this situation, the situation may transit to the situation S8.

The situation S8 indicates a situation in which the battery 222 cannot be used or is not used. In this situation, the servers are sequentially changed to the sleep mode in ascending order of priority until the power consumption of all servers becomes equal to or less than the supply power value (AC) of the system power (suppressed to AC). At the same time, an alert indicating that the electric energy is short is generated.

The situation S9 indicates a situation in which the system power is down due to a power failure or maintenance. If the total power consumption when all servers are driven in the L mode does not exceed the suppliable power value of the battery 222 in this situation, all the servers 361 are driven in the power saving mode to gain time, an alert is generated, and recovery from the power failure is waited.

The situation S10 indicates a situation in which the system power is down due to a power failure or maintenance. If the total power consumption when all servers are driven in the L mode exceeds the suppliable power value of the battery 222 in this situation, the servers 361 are sequentially shifted to the sleep mode in ascending order of priority. At the same time, an alert is generated, and recovery from the power failure is waited.

Assuming that the system power is more reliable than the battery 222, FIG. 9 shows the system power on the left side and the battery on the right side on each bar graph in the column 902. However, the order may be reversed. That is, control may be done to actively use the battery and use the system power only when the supply power value of the battery has temporarily fallen below a predetermined value. In this case, control is performed to suppress power consumption to the battery power value by controlling the driving modes of the servers.

Figure 10:
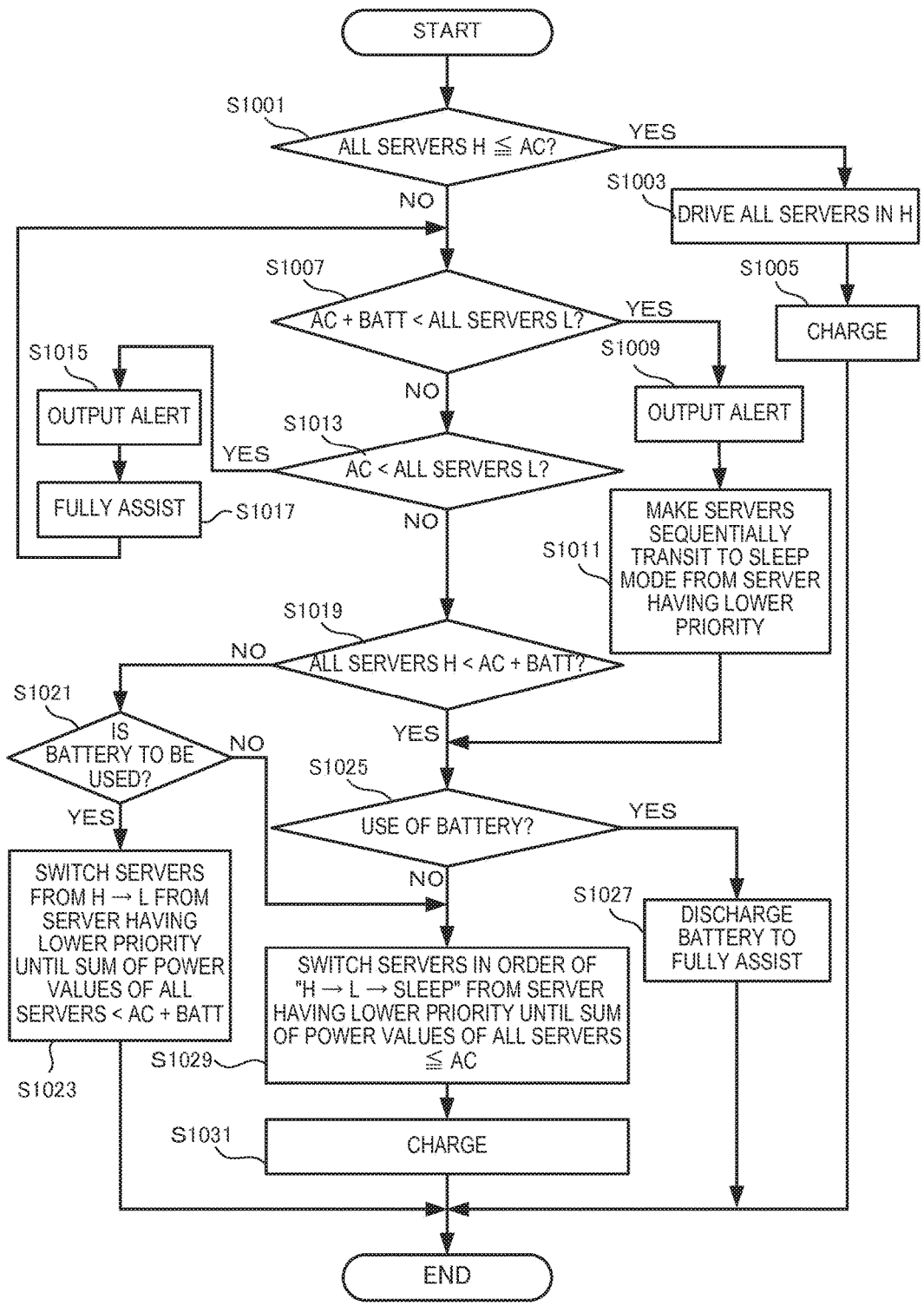
FIG. 10 is a flowchart for explaining the procedure of processing of the power management apparatus according to the fourth embodiment of the present invention.

FIG. 10 is a flowchart for explaining the procedure of processing, complying with FIG. 9, of the power management apparatus according to this embodiment.

First in step S1001, the server controller 505 determines whether the sum of necessary power values in a case in which all servers in a region are driven in the H mode is equal to or less than the supply power value AC of the system power. If the sum of necessary power values in the case in which all servers are driven in the H mode is equal to or less than the supply power value AC of the system power, the process advances to step S1003, and the server controller 505 drives all servers in the high output mode (H mode). In step S1005, charging is performed.

In step S1001, if the sum of necessary power values in the case in which all servers in the region are driven in the H mode is more than the supply power value AC of the system power (situation S2 in FIG. 9), the process advances to step S1007. In step S1007, if the sum of the supply power value AC of the system power and the supply power value BATT of the battery 222 is smaller than the sum of necessary power values in a case in which all servers in the region are driven in the L mode (situation S8), the process advances to step S1009. In step S1009, the server controller 505 generates an alert, and then advances to step S1011. In step S1011, the server controller 505 sequentially shifts the servers to the sleep mode in ascending order of priority until the sum of the necessary powers of all servers in the region becomes smaller than the sum of the supply power value AC of the system power and the supply power value BATT of the battery 222, and then advances to step S1025.

In step S1007, if the sum of the supply power value AC of the system power and the supply power value BATT of the battery 222 is equal to or more than the sum of necessary power values in the case in which all servers in the region are driven in the L mode (situation S5), the process advances to step S1013. In step S1013, if the necessary power value in the case in which all servers in the region are driven in the L mode is larger than the supply power value AC of the system power (situation S7), the process advances to step S1015. In step S1015, the server controller 505 generates an alert to notify that "the battery 222 needs to be used to drive all servers", and advances to step S1017. In step S1017, the server controller 505 drives all servers in the L mode using the power of the battery 222 until it is determined in step S1007 that the power of the battery 222 is short.

Next, the process advances to step S1019, the server controller 505 determines whether the necessary power value in the case in which all servers are driven in the H mode is smaller than the sum of the supply power value AC of the system power and the supply power value BATT of the battery 222.

If the necessary power value in the case in which all servers are driven in the H mode is equal to or larger than the sum of the supply power value AC of the system power and the supply power value BATT of the battery 222 (situation S4), the process advances to step S1021, and the server controller 505 determines whether to use the battery 222. To use the battery 222, the process advances to step S1023, and the server controller 505 sequentially switches the servers from the H mode to the L mode in ascending order of priority until the necessary power value of all servers becomes smaller than the sum of the supply power value AC of the system power and the supply power value BATT of the battery 222.

Upon determining not to use the battery 222 in step S1021, the process advances to step S1029, and the server controller 505 switches the driving modes of the servers in the order of H→L→sleep in ascending order of priority until the sum of the necessary power values of all servers becomes equal to or smaller than the supply power value AC of the system power. The process advances to step S1031. If there is a surplus of the supply power value AC of the system power, the server controller 505 performs charging.

As described above, it is possible to effectively and efficiently supply power to the server system using the system power and the battery by controlling the driving mode of each server in accordance with the situation.

Fifth Embodiment

Figure 11:
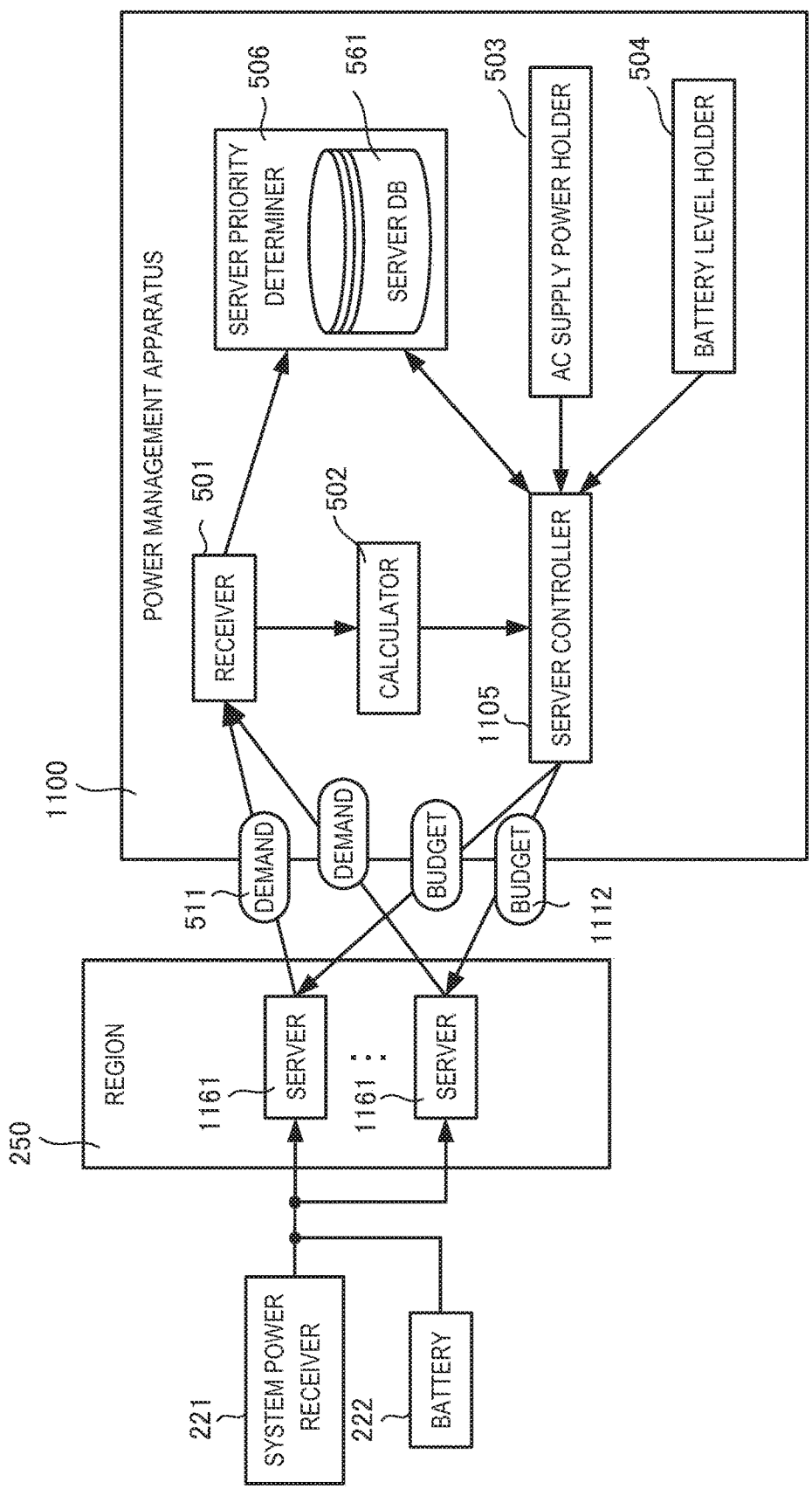
FIG. 11 is a block diagram showing the functional arrangement of a power management apparatus according to the fifth embodiment of the present invention.

A power management apparatus according to the fifth embodiment of the present invention will be described next with reference to FIGS. 11 and 12. FIG. 11 is a block diagram for explaining the functional arrangement of the power management apparatus according to this embodiment. The power management apparatus according to this embodiment is different from the second embodiment in that instead of designating the driving mode of a server, a budget concerning power is notified to a server. The rest of the components and operations is the same as in the second embodiment. Hence, the same reference numerals denote the same components and operations, and a detailed description thereof will be omitted.

FIG. 11 is a block diagram showing the functional arrangement of a power management apparatus according to this embodiment. A power management apparatus 1100 includes a server controller 1105 that determines a budget (usable maximum electric energy) 1112 of each server and notifies it. Each server 1161 determines the driving mode by itself in accordance with the budget 1112 received from the server controller 1105. The server controller 1105 calculates the upper limit value of an electric energy usable by each server in accordance with priority determined for each server by a server priority determiner 506. The server controller 1105 notifies the plurality of servers 1161 of the upper limit values of electric energies usable by the plurality of servers 1161. Each server 1161 operates by an electric energy equal to or less than the notified upper limit value.

Figure 12:
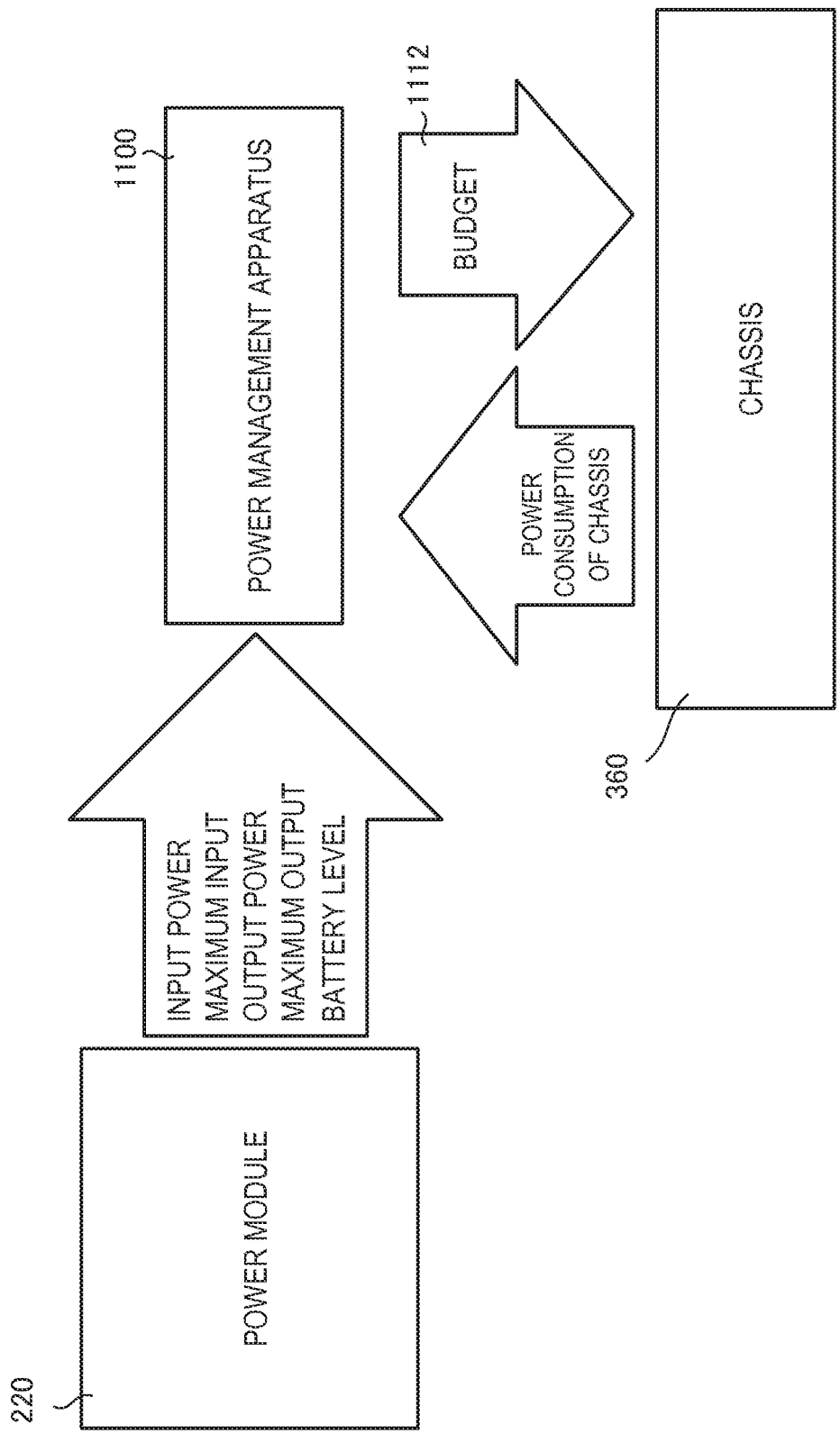
FIG. 12 is a view showing exchange of power supply-related information according to the fifth embodiment of the present invention.

FIG. 12 is a view showing exchange of power supply-related information according to this embodiment. As shown in FIG. 12, the power management apparatus 1100 notifies a chassis 360 of the budget 1112.

In this embodiment, the server controller 1105 determines the budget of each server. However, the server controller 1105 may determine the budget of a plurality of servers (for example, servers in the chassis 360). In this case, the plurality of servers share the budget. As the sharing method, for example, the plurality of servers may uniformly share the budget. Alternatively, a server with high priority may ensure the budget first and return it if it is unnecessary.

According to the arrangement and operation of the above-described embodiment, since the server driving mode is determined in accordance with the budget, it is possible to effectively and efficiently supply power to the server system using the system power and the battery. That is, it is possible to implement a power consumption much lower than a conventional average power consumption defined by the sum of maximum power consumptions of all servers.

Sixth Embodiment

Figure 13:
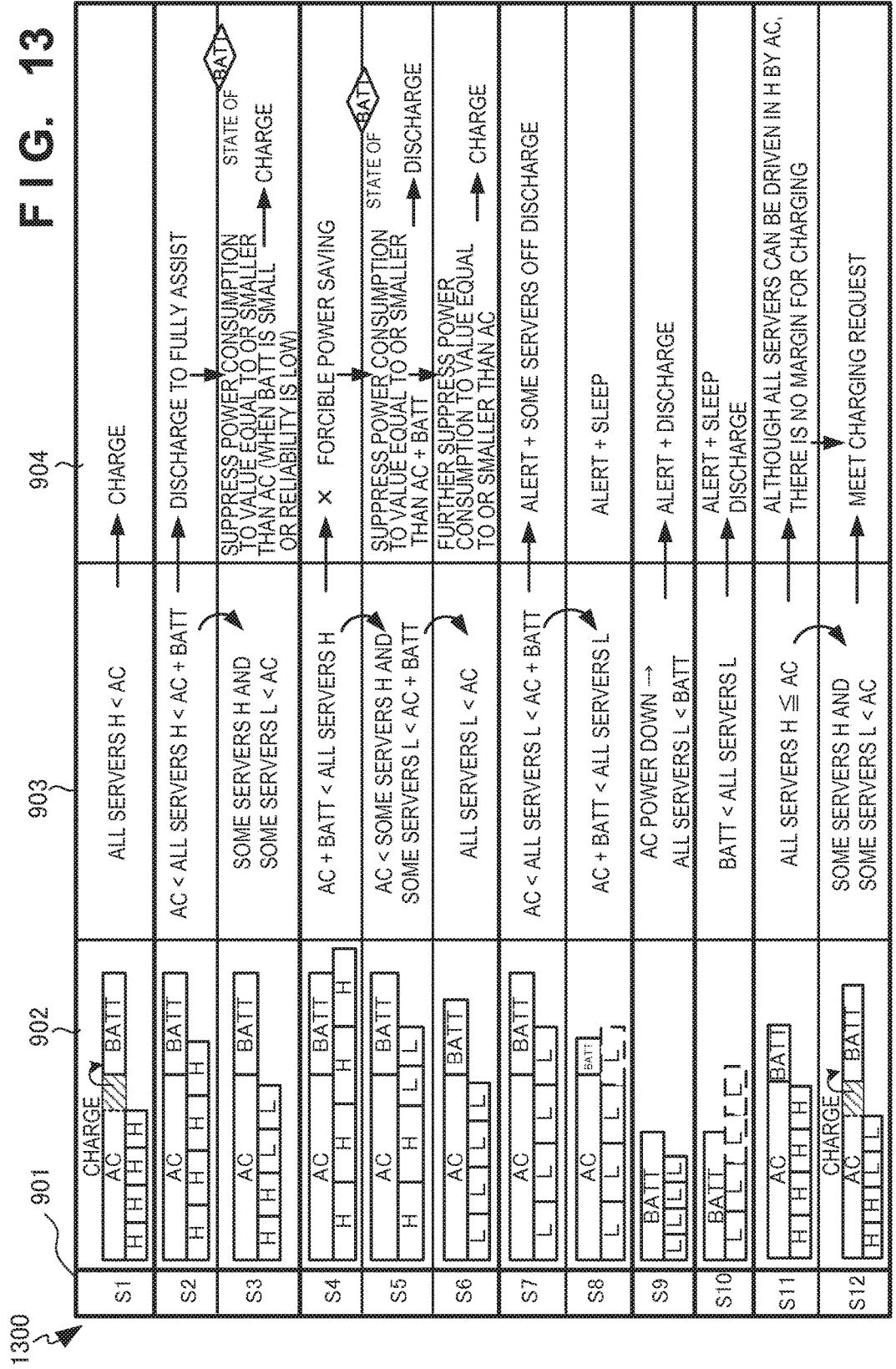
FIG. 13 is a view for explaining the function of a power management apparatus according to the sixth embodiment of the present invention.

A power management apparatus according to the sixth embodiment of the present invention will be described next with reference to FIGS. 13 and 14. FIG. 13 is a view for explaining the function of the power management apparatus according to this embodiment. FIG. 13 illustrates a table 1300 that shows examples of server driving control in the respective situations. The table 1300 shows a server control method in each of, for example, 12 situations S1 to S12. The table 1300 is different from the table 900 shown in FIG. 9 in that the situations S11 and S12 are added. The rest of the contents is the same as in the table 900. Hence, the same reference numerals denote the same components and operations, and a detailed description thereof will be omitted.

The situation S11 indicates a situation in which the total power consumption when all servers are driven in the H mode is less than the supply power value (AC) of the system power, but there is no margin to charge a battery 222. In this case, although the server driving request is completely met, a request to charge the battery 222 cannot be met. In this embodiment, if there is a request to charge the battery 222 in the situation S11, the situation transits to the situation S12 in which some servers are driven in the L mode. The request to charge the battery 222 is assumed to exist in a case in which the remaining power value of the battery 222 has fallen below a predetermined value.

Figure 14A:
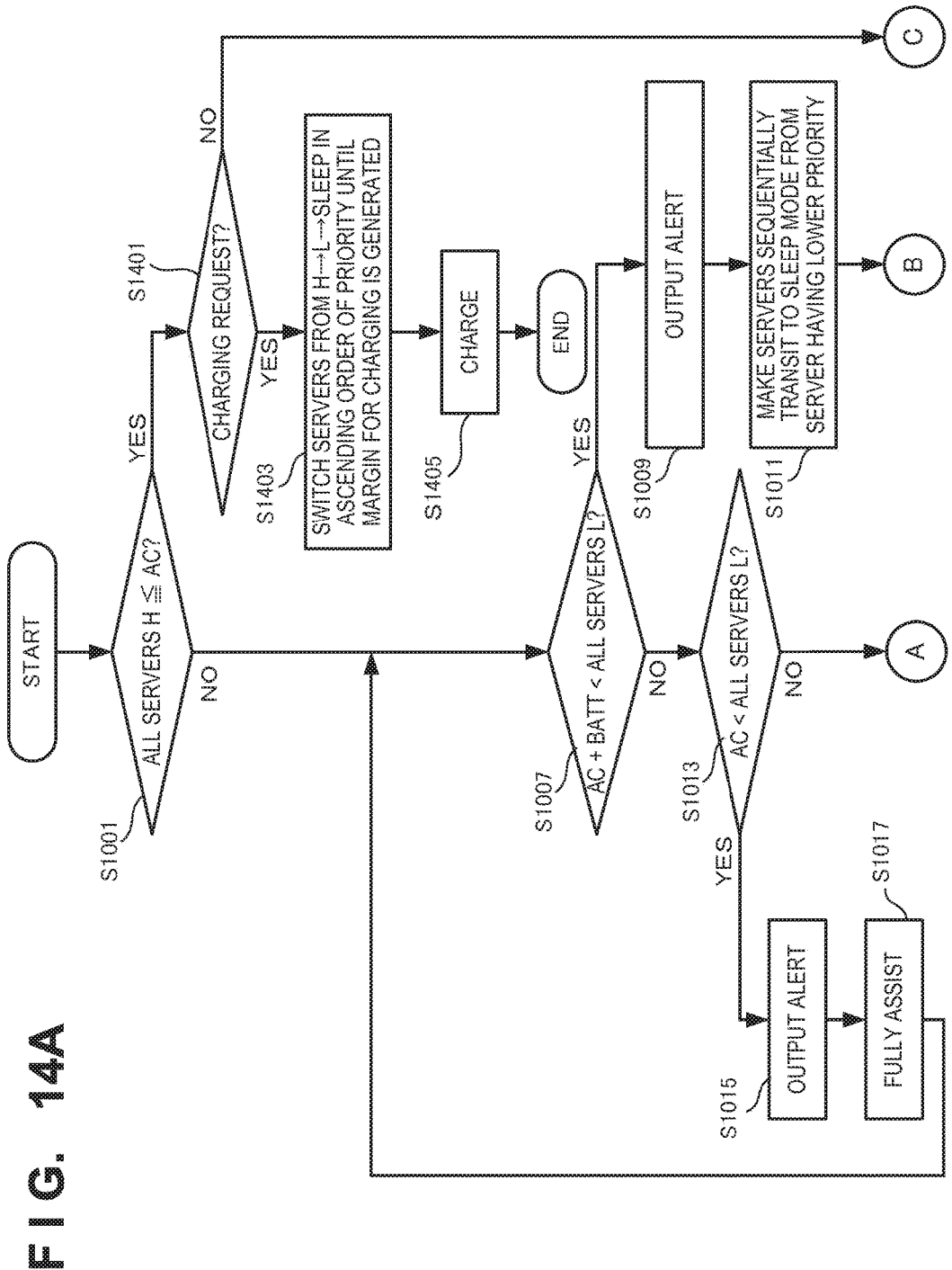
FIGS. 14A and 14B are flowchart for explaining the procedure of processing of the power management apparatus according to the sixth embodiment of the present invention.
Figure 14B:
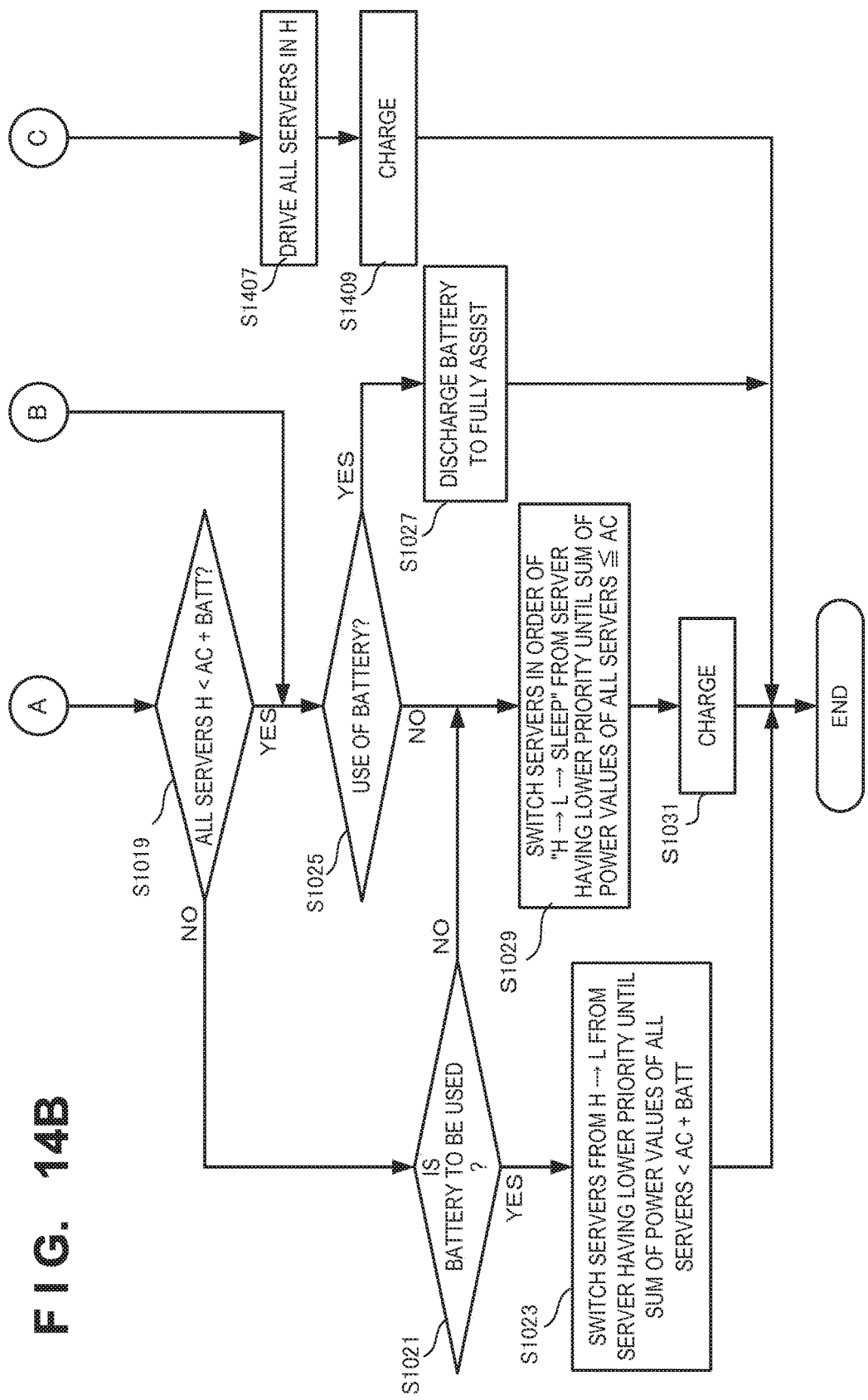

FIGS. 14A and 14B are flowchart for explaining the procedure of processing, complying with FIG. 13, of the power management apparatus according to this embodiment. This flowchart is different from the flowchart of FIG. 10 in that steps S1401 to S1409 are added. The rest of the contents is the same as in the flowchart of FIG. 10. Hence, the same reference numerals denote the same components and operations, and a detailed description thereof will be omitted.

First in step S1001, a server controller 505 determines whether the sum of necessary power values in a case in which all servers in a region are driven in the H mode is equal to or less than a supply power value AC of the system power. If the sum of necessary power values in the case in which all servers are driven in the H mode is equal to or less than the supply power value AC of the system power, the process advances to step S1401, and the server controller 505 determines whether a charging request exists. If a charging request exists, the process advances to step S1403.

In step S1403, the server controller 505 switches the driving modes of servers with low priority until a margin for charging is generated, that is, until the power consumption of all servers decreases to C (a value obtained by subtracting power necessary for charging from the maximum output power of the system power) or less in FIG. 6. More specifically, the server controller 505 repetitively determines whether there is a margin for charging while sequentially switching the driving mode of the server from the H mode to the L mode. If there is a margin for charging, the servers are driven in the driving modes at that point of time. If there is not yet a margin for charging even when all servers are driven in the L mode, the server controller 505 repetitively determines whether there is a margin for charging while sequentially switching the servers to the sleep mode in ascending order of priority. If there is a margin for charging, the process advances to step S1405 to charge the battery 222.

Upon determining in step S1401 that no charging request exists, the process advances to step S1407, and the server controller 505 drives all servers in the H mode. In step S1409, if there is a margin for charging, charging is performed (if there is no margin for charging, charging is not performed).

Figure 15:
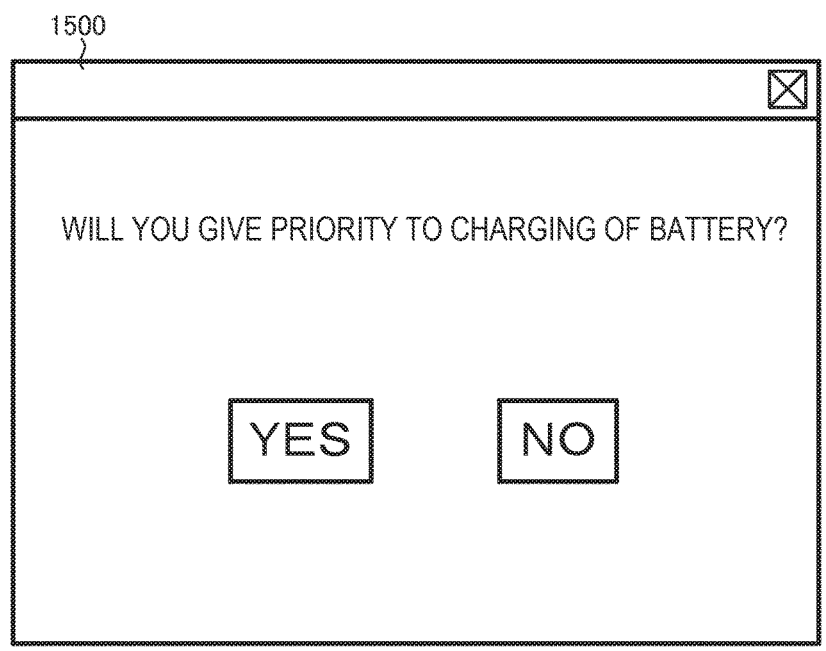
FIG. 15 is a view showing the display screen of the power management apparatus according to the sixth embodiment of the present invention.

A setting to define whether to give priority to battery charging may be accepted in advance via the control screen of the power management apparatus as shown in FIG. 15. In this case, if priority to battery charging is set, it is determined in step S1401 that a charging request exists.

Alternatively, in step S1401, the server controller 505 may determine whether a charging request exists based on the remaining power value of the battery 222. That is, if the remaining power value of the battery 222 is smaller than a predetermined value, the server controller 505 determines that the charging request of the battery 222 is intense, and gives priority to charging of the battery 222 over driving of the servers. For example, based on the minimum power value necessary to drive all servers in the L mode and a time estimated to be needed for recovery from a power failure, the server controller 505 may determine the remaining power value (above-described "predetermined value") that should be ensured in the battery 222.

With the above-described control, in this embodiment, it is possible to drive the servers while placing focus on the electricity storage amount in the battery by driving the servers in the L mode to given priority to charging of the battery.

Other Embodiments

Figure 18:
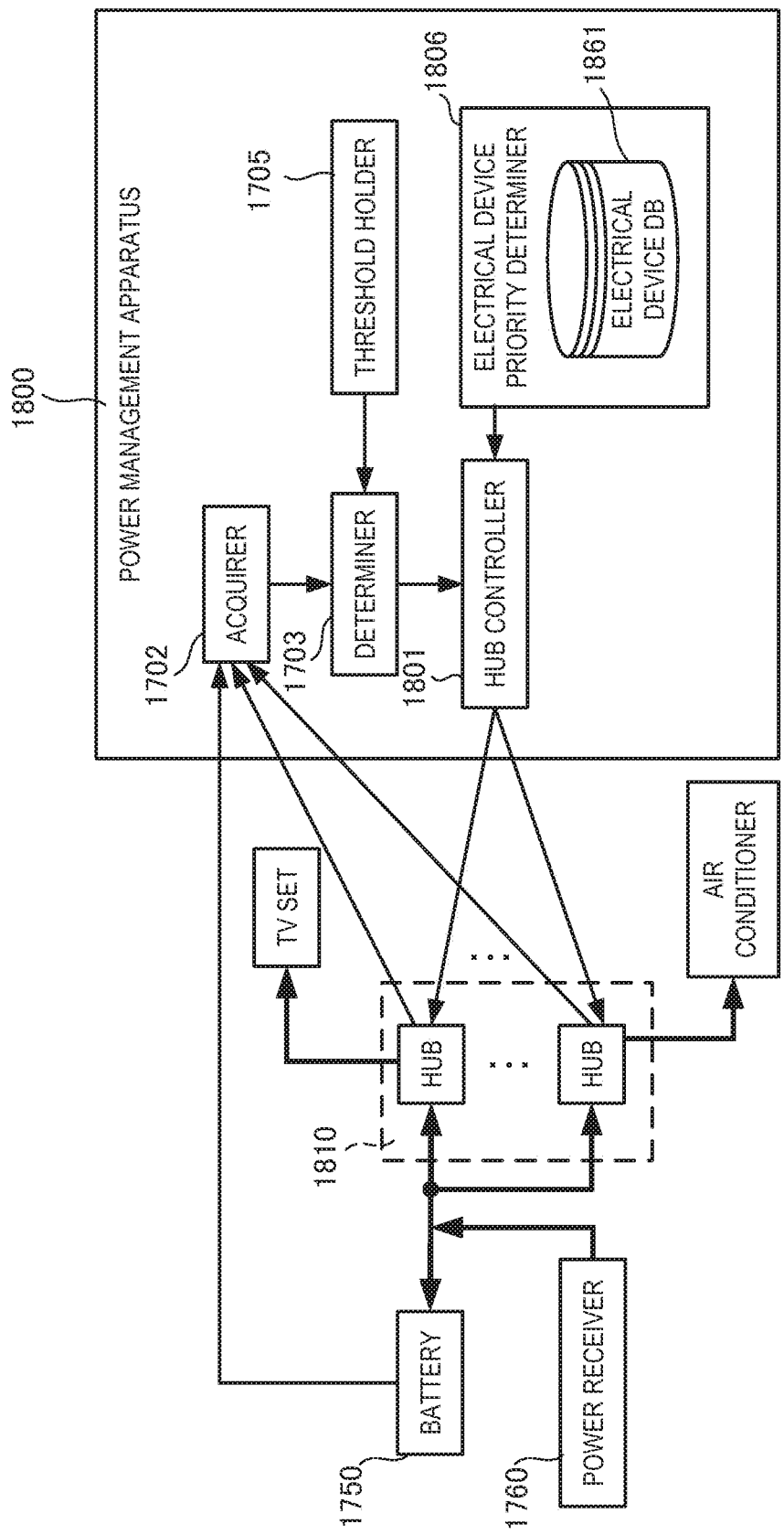
FIG. 18 is a block diagram showing the arrangement of a power management apparatus according to a modification of the present invention.

Note that in the second to sixth embodiments, a server has been explained as an example of an information processing apparatus to which power is supplied. However, the present invention is not limited to this, and an arrangement for controlling electrical devices such as a storage device, network device, PC (Personal Computer), TV set, air conditioner, and other home appliances may be employed. For example, an arrangement is considerable in which, as shown in FIG. 18, when supplying power from a battery 1750 and a power receiver 1760 to electrical devices, the power is supplied to the electrical device via a plurality of hubs 1810.

The hubs 1810 can perform various kinds of switching for power supply to turn on/off a TV set, adjust the temperature of an air conditioner or refrigerator, or adjust the brightness of an illumination. In this case as well, a hub controller 1801 controls the hubs 1810 based on the remaining electric energy of the battery 1750, a predetermined threshold, and priority determined by an electrical device priority determiner 1806 with reference to an electrical device database 1861, as in the second embodiment.

In the embodiments, a system power source and a battery have been described as power supply sources. However, the present invention is not limited to this, and two power sources suffice. For example, an information processing apparatus may be controlled based on power from two power sources including a system power source based on a fossil fuel and a system power source based on renewable energy. For example, the driving mode of an information processing apparatus may be controlled in accordance with power values from three or more kinds of power sources. As the driving modes of a server, the H mode, L mode, and sleep mode have been exemplified. However, another mode (for example, an M mode of an intermediate power consumption between the H mode and the L mode) may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

Other Expressions of Embodiments

Some or all of the above-described embodiments can also be described as in the following supplementary notes but are not limited to the followings.

(Supplementary Note 1)

There is provided a power management apparatus comprising:

a receiver that receives, from each of a plurality of information processing apparatuses, power request information about an electric energy requested by each of the plurality of information processing apparatuses;

a calculator that calculates a total requested electric energy requested by the plurality of information processing apparatuses based on the power request information;

a first power value holder that holds a first suppliable power value from a first power source capable of supplying power to the plurality of information processing apparatuses;

a second power value holder that holds a second suppliable power value from a second power source capable of supplying power to the plurality of information processing apparatuses; and a controller that controls the plurality of information processing apparatuses based on the total requested electric energy, the first suppliable power value, and the second suppliable power value.

(Supplementary Note 2)

There is provided the power management apparatus according to supplementary note 1, wherein each of the plurality of information processing apparatuses can be driven in at least two driving modes including a high power mode in which a power consumption is high and a low power mode in which the power consumption is low, and the controller determines the driving mode of each of the plurality of information processing apparatuses.

(Supplementary Note 3)

There is provided the power management apparatus according to supplementary note 1 or 2, wherein the controller notifies each of the plurality of information processing apparatuses of an upper limit value of an electric energy usable by each of the plurality of information processing apparatuses and controls each of the plurality of information processing apparatuses by an electric energy not more than the upper limit value.

(Supplementary Note 4)

There is provided the power management apparatus according to supplementary note 1, wherein the first power source comprises a system power source, the second power source comprises a battery, and the second power value holder comprises a unit that monitors a remaining electric energy of the battery capable of supplying power to the plurality of information processing apparatuses.

(Supplementary Note 5)

There is provided the power management apparatus according to supplementary note 1, further comprising a setting unit that sets priority of each of the plurality of information processing apparatuses, wherein if the total requested electric energy is smaller than a total power value of the first suppliable power value and the second suppliable power value, the controller determines whether to use the second power source, upon determining to use the second power source, the controller drives the plurality of information processing apparatuses using both power from the first power source and power from the second power source, and upon determining not to use the second power source, the controller controls the plurality of information processing apparatuses in accordance with the priority.

(Supplementary Note 6)

There is provided the power management apparatus according to supplementary note 5, wherein upon determining not to use the second power source, the controller controls the plurality of information processing apparatuses in accordance with the priority such that the plurality of information processing apparatuses can be driven only by the power from the first power source.

(Supplementary Note 7)

There is provided the power management apparatus according to supplementary note 6, wherein the controller controls to drive an information processing apparatus with low priority in a mode with a power consumption lower than that of an information processing apparatus with high priority.

(Supplementary Note 8)

There is provided the power management apparatus according to any one of supplementary notes 5 to 7, wherein the first power source comprises a system power source, the second power source comprises a battery, and if a remaining electric energy of the battery is not more than a predetermined value, the controller controls to drive the information processing apparatus with the low priority in the mode with the power consumption lower than that of the information processing apparatus with the high priority such that the plurality of information processing apparatuses can be driven only by the power from the system power source.

(Supplementary Note 9)

There is provided the power management apparatus according to any one of supplementary notes 5 to 8, wherein the first power source comprises a system power source, the second power source comprises a battery, and if it is determined not to use the battery, and a remaining electric energy of the battery is not more than a predetermined value, the controller controls to drive the information processing apparatus with the low priority in the mode with the power consumption lower than that of the information processing apparatus with the high priority such that the battery can be charged.

(Supplementary Note 10)

There is provided a power management method comprising:

receiving, from each of a plurality of information processing apparatuses, power request information about an electric energy requested by each of the plurality of information processing apparatuses;

calculating a total requested electric energy requested by the plurality of information processing apparatuses based on the power request information; and controlling the plurality of information processing apparatuses based on a first suppliable power value from a first power source capable of supplying power to the plurality of information processing apparatuses, a second suppliable power value from a second power source capable of supplying power to the plurality of information processing apparatuses; and the total requested electric energy.

(Supplementary Note 11)

There is provided a power management program for causing a computer to execute a method comprising:

receiving, from each of a plurality of information processing apparatuses, power request information about an electric energy requested by each of the plurality of information processing apparatuses:

calculating a total requested electric energy requested by the plurality of information processing apparatuses based on the power request information; and controlling the plurality of information processing apparatuses based on a first suppliable power value from a first power source capable of supplying power to the plurality of information processing apparatuses, a second suppliable power value from a second power source capable of supplying power to the plurality of information processing apparatuses; and the total requested electric energy.

(Supplementary Note 12)

There is provided an information processing system comprising:

a plurality of information processing apparatuses;

a receiver that receives, from each of a plurality of information processing apparatuses, power request information about an electric energy requested by each of the plurality of information processing apparatuses;

a calculator that calculates a total requested electric energy requested by the plurality of information processing apparatuses based on the power request information;

a first power value holder that holds a first suppliable power value from a first power source capable of supplying power to the plurality of information processing apparatuses;

a second power value holder that holds a second suppliable power value from a second power source capable of supplying power to the plurality of information processing apparatuses; and a controller that controls the plurality of information processing apparatuses based on the total requested electric energy, the first suppliable power value, and the second suppliable power value.

This application claims the benefit of Japanese Patent Application No. 2013-118361 filed on Jun. 4, 2013 and Japanese Patent Application No. 2013-237304 filed on Nov. 15, 2013, which are hereby incorporated by reference herein in their entirety.

The invention claimed is:

1. A power management apparatus comprising:

memory for storing instructions; and a processor configured to execute the instructions to:

control a plurality of devices that receive a distribution of total power supplied from a power storage device and another power supply;

acquire a remaining electric energy of the power storage device; and determine whether the remaining electric energy of the power storage device is not more than a first value, wherein if the remaining electric energy of the power storage device is not more than the first value, until the remaining electric energy of the power storage device becomes more than a second value which is more than the first value, the processor is further configured to execute instructions to control the plurality of devices such that the power from the other power supply is distributed to the power storage device prior to the plurality of devices.

2. The power management apparatus according to claim 1, wherein if the remaining electric energy of the power storage device is not more than the first predetermined value, said processor executes the instructions to control the plurality of devices such that the power from the other power supply is distributed to the power storage device with priority over the plurality of devices.

3. The power management apparatus according to claim 2, wherein said processor executes the instructions to control the plurality of devices such that the power from the other power supply is distributed to the power storage device with priority over the plurality of devices until the remaining electric energy of the power storage device exceeds the second predetermined value larger than the first predetermined value.

4. The power management apparatus according to claim 3, wherein said processor executes the instructions to select a device based on priority of an application executed in each of the plurality of devices.

5. The power management apparatus according to claim 3, wherein said processor executes the instructions to dynamically change the second predetermined value in accordance with states of the plurality of devices.

6. The power management apparatus according to claim 5, wherein said processor executes the instructions to increase the second predetermined value when a number of devices that are operating increases.

7. The power management apparatus according to claim 5, wherein said processor executes the instructions to increase the second predetermined value when a calculation amount of the plurality of devices increases.

8. The power management apparatus according to claim 2, wherein said processor executes the instructions to control the plurality of devices such that charging of the power storage device to a predetermined electric energy is completed within a predetermined time by distributing the power from the other power supply to the power storage device with priority over the plurality of devices.

9. The power management apparatus according to claim 1, wherein said processor executes the instructions to reduce a power consumption of a predetermined device included in the plurality of devices so as to enable power distribution to the power storage device.

10. The power management apparatus according to claim 9, wherein said processor executes the instructions to select some devices out of the plurality of devices based on the priority, and reduces the power consumption.

11. The power management apparatus according to claim 9, wherein said processor executes the instructions to select some devices out of the plurality of devices in ascending order of priority, and reduces the power consumption so as to enable power distribution to the power storage device.

12. The power management apparatus according to claim 1, wherein said processor executes the instructions to preferentially shift a device that is operating in a mode with a power consumption higher than that of remaining devices of the plurality of devices to a mode with a low power consumption, thereby reducing the power consumption.

13. The power management apparatus according to claim 1, wherein if the remaining electric energy of the power storage device is not more than a third predetermined value, and the power consumption of the plurality of devices is not less than a suppliable electric energy of the other power supply, said processor executes the instructions to output an alarm or stop the plurality of devices.

14. The power management apparatus according to claim 1, wherein if said processor executes the instructions to determine that the remaining electric energy of the power storage device is not less than a third predetermined value larger than the first predetermined value,
said processor executes the instructions to distribute the total power supplied from the power storage device and the other power supply to the plurality of devices.

15. The power management apparatus according to claim 14, wherein if said processor executes the instructions to determine that the remaining electric energy of the power storage device is not less than the third predetermined value, said processor executes the instructions to distribute a device with high priority from the plurality of devices and increases the power consumption.

16. The power management apparatus according to claim 14, wherein if said processor executes the instructions to determine that the remaining electric energy of the power storage device is not less than the third predetermined value, said processor executes the instructions to distribute a device that has shifted to a mode with a low power consumption from the plurality of devices and increases the power consumption.

17. The power management apparatus according to claim 1, wherein if said processor executes the instructions to determine that the remaining electric energy of the power storage device is not less than a third predetermined value larger than the first predetermined value,
said processor executes the instructions to distribute the power supplied from the other power supply to the plurality of devices without charging or discharging the power storage device.

18. The power management apparatus according to claim 1, wherein each of the plurality of devices comprises an information processing apparatus.

19. A power management method of a system including a plurality of devices, a power storage device, and another power supply, comprising:
acquiring a remaining electric energy of the power storage device;
determining whether the remaining electric energy of the power storage device is not more than a first value; and
controlling the plurality of devices such that the power from the other power supply is distributed to the power storage device prior to the plurality of devices, if the remaining electric energy of the power storage device is not more than the first value and until the remaining electric energy of the power storage device becomes more than a second value which is more than the first value.

20. A power supply system including a power storage device and another power supply, which supply power to a plurality of devices, comprising:
memory for storing instructions; and
at least one processor configured to execute the instructions to:
acquire a remaining electric energy of the power storage device;
determine whether the remaining electric energy of the power storage device is not more than a first value; and
control the plurality of devices such that the power from the other power supply is distributed to the power storage device prior to the plurality of devices if the remaining electric energy of the power storage device becomes more than a second value, which is more than the first value.

* * * * *